(12) United States Patent
Povinelli et al.

(10) Patent No.: US 10,807,657 B2
(45) Date of Patent: Oct. 20, 2020

(54) DEPLOYABLE AERODYNAMIC SIDE PANEL SYSTEM

(71) Applicant: Magna Exteriors Inc., Concord (CA)

(72) Inventors: Anthony J. Povinelli, Romeo, MI (US); Martin R. Matthews, Troy, MI (US)

(73) Assignee: Magna Exteriors Inc., Concord (CA)

( * ) Notice: Subject to any disclaimer, the term of this patent is extended or adjusted under 35 U.S.C. 154(b) by 133 days.

(21) Appl. No.: 16/214,892

(22) Filed: Dec. 10, 2018

(65) Prior Publication Data

US 2019/0152542 A1 May 23, 2019

Related U.S. Application Data

(62) Division of application No. 15/128,023, filed as application No. PCT/US2015/021701 on Mar. 20, 2015, now Pat. No. 10,189,517.

(Continued)

(51) Int. Cl.
*B60J 9/00* (2006.01)
*B62D 35/00* (2006.01)
*B62D 37/02* (2006.01)

(52) U.S. Cl.
CPC .......... *B62D 35/008* (2013.01); *B62D 37/02* (2013.01); *Y02T 10/82* (2013.01)

(58) Field of Classification Search
CPC ...... B62D 37/02; B62D 35/02; B62D 35/005; B62D 35/001; Y02T 10/82; B64G 1/503;

(Continued)

(56) References Cited

U.S. PATENT DOCUMENTS 4,262,953 A * 4/1981 McErlane ............ B62D 35/001
  296/180.4
4,659,130 A * 4/1987 Dimora ................ B62D 35/005
  296/180.1

(Continued)

FOREIGN PATENT DOCUMENTS

CN  101947980 A  1/2011
CN  202089126 U  12/2011

(Continued)

OTHER PUBLICATIONS

International Search Report for International Application No. PCT/US2014/043185, dated Oct. 7, 2014.

(Continued)

*Primary Examiner* — Kiran B Patel
(74) *Attorney, Agent, or Firm* — Warn Partners, P.C.

(57) ABSTRACT

An active side panel assembly having at least one deployable panel (22) and at least one actuator (30). The deployable panel deploys and retracts based on vehicle requirements and provides valueable reduction in vehicle drag, thereby reducing emissions and improving fuel economy. Additionally, it allows for the system to retract so the vehicle can still meet ground clearances, ramp angles, off-road requirements, etc. The active side panel provides a fully deployable system with object detection, declutching of the actuator to help prevent damage, and communication with the vehicle to determine proper deployment and function.

14 Claims, 24 Drawing Sheets

Related U.S. Application Data

(60) Provisional application No. 61/968,482, filed on Mar. 21, 2014.

(58) Field of Classification Search
CPC ....... B64G 1/50; B60R 21/235; B60R 21/232; B60R 2021/0006
See application file for complete search history.

(56) References Cited

U.S. PATENT DOCUMENTS

| | | | |
|---|---|---|---|
| 4,688,824 A * | 8/1987 | Herring | B60R 21/34 280/762 |
| 5,234,249 A * | 8/1993 | Dorrell | B62D 33/0273 296/180.1 |
| 5,462,324 A * | 10/1995 | Bowen | B60R 21/34 293/15 |
| 5,536,062 A | 7/1996 | Spears | |
| 5,769,177 A | 6/1998 | Wickman | |
| 6,149,544 A | 11/2000 | Masberg et al. | |
| 6,184,603 B1 | 2/2001 | Hamai et al. | |
| 6,189,837 B1 * | 2/2001 | Matthews | B64C 9/323 244/213 |
| 6,322,221 B1 | 11/2001 | van de Loo | |
| 6,886,883 B2 * | 5/2005 | Jacquemard | B62D 35/005 296/180.5 |
| 7,374,299 B2 | 5/2008 | Brouwer et al. | |
| 7,387,330 B2 * | 6/2008 | Froeschle | B62D 35/007 296/180.5 |
| 7,387,331 B2 * | 6/2008 | Froeschle | B62D 35/007 296/180.5 |
| 7,438,347 B2 * | 10/2008 | Froeschle | B62D 35/007 296/180.5 |
| 7,497,502 B2 * | 3/2009 | Wood | B62D 35/001 296/180.1 |
| 7,578,484 B2 * | 8/2009 | Fox | B64C 9/22 244/214 |
| 7,708,335 B2 * | 5/2010 | Wegener | B60T 1/16 296/180.1 |
| 8,297,685 B2 * | 10/2012 | Wolf | B62D 35/005 296/180.3 |
| 8,322,333 B2 * | 12/2012 | Marcotte | F24S 23/74 126/694 |
| 8,366,284 B2 | 2/2013 | Flynn et al. | |
| 8,403,401 B2 * | 3/2013 | Rinehart | B62D 35/001 296/180.3 |
| 8,684,316 B2 * | 4/2014 | Sakurai | B64C 9/16 244/216 |
| 8,702,152 B1 * | 4/2014 | Platto | B62D 37/02 296/180.1 |
| 9,004,575 B2 * | 4/2015 | Grandominico | B62D 25/168 296/180.4 |
| 9,561,827 B2 * | 2/2017 | Parry-Williams | B60K 11/085 |
| 9,713,947 B2 | 7/2017 | Irwin et al. | |
| 10,457,339 B2 * | 10/2019 | Virdie | B62D 35/007 |
| 2003/0227194 A1 * | 12/2003 | Farlow | B62D 35/001 296/180.4 |
| 2005/0161577 A1 | 7/2005 | French | |
| 2006/0081800 A1 | 4/2006 | Riester et al. | |
| 2008/0036173 A1 * | 2/2008 | Alguera | B62D 53/0821 280/407 |
| 2008/0129079 A1 * | 6/2008 | Plett | B60R 3/02 296/146.5 |
| 2008/0284265 A1 | 11/2008 | Chaohai et al. | |
| 2009/0146453 A1 * | 6/2009 | Ortega | B62D 35/001 296/180.4 |
| 2009/0189414 A1 * | 7/2009 | Boivin | B62D 35/001 296/180.4 |
| 2009/0195017 A1 * | 8/2009 | Wood | B62D 35/001 296/180.4 |
| 2010/0201152 A1 * | 8/2010 | Smith | B62D 35/001 296/180.3 |
| 2011/0148143 A1 | 6/2011 | Ondracek | |
| 2011/0241377 A1 * | 10/2011 | Rogers | B62D 35/001 296/180.3 |
| 2012/0330513 A1 * | 12/2012 | Charnesky | G01S 13/931 701/48 |
| 2013/0181477 A1 * | 7/2013 | Reiman | B62D 35/001 296/180.4 |
| 2016/0244107 A1 | 8/2016 | Ishiba | |
| 2017/0240223 A1 | 8/2017 | Gaylard et al. | |

FOREIGN PATENT DOCUMENTS

| | | |
|---|---|---|
| DE | 19509568 C1 | 8/1996 |
| DE | 29704882 U1 | 5/1997 |
| DE | 102008052518 A1 | 6/2009 |
| EP | 0802348 A2 | 10/1997 |
| EP | 1594212 A2 | 11/2005 |
| EP | 1755923 A1 | 2/2007 |
| GB | 616119 A | 1/1949 |
| JP | S55132343 A | 10/1980 |
| WO | 2015143294 A1 | 9/2015 |
| WO | 2016020420 A1 | 2/2016 |

OTHER PUBLICATIONS

International Search Report for International Application No. PCT/US2015/021701, Filed Mar. 20, 2015.

* cited by examiner

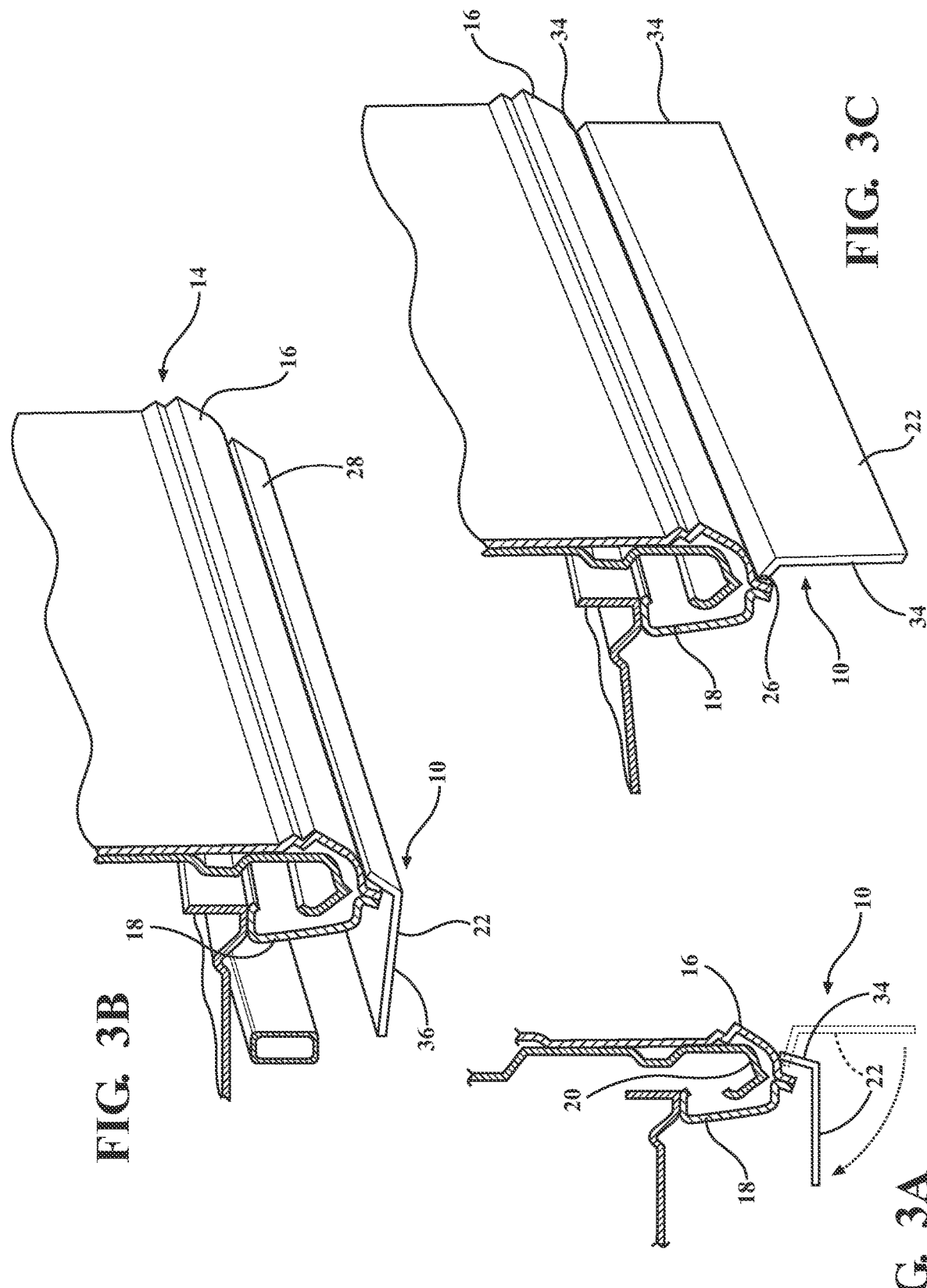

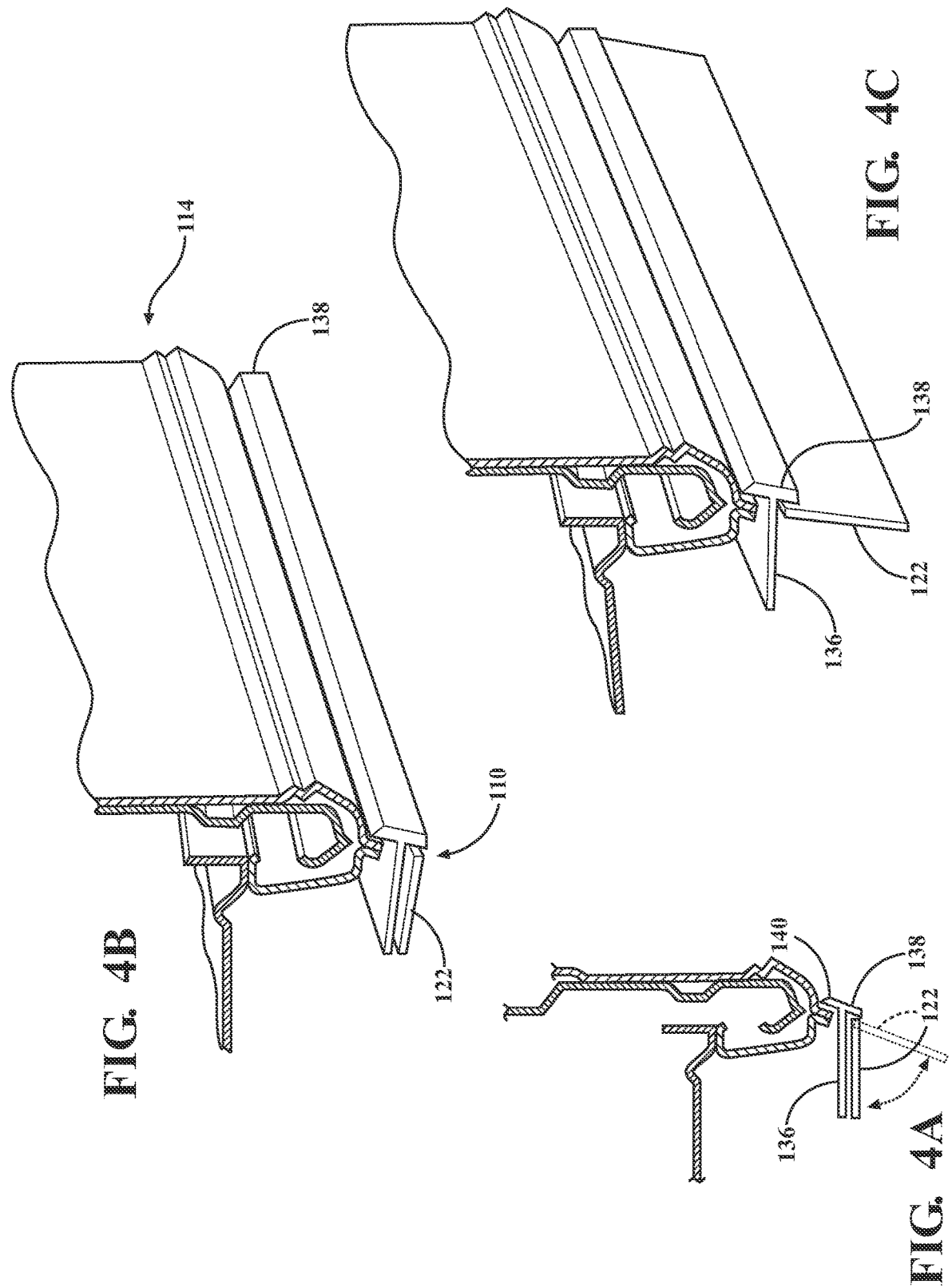

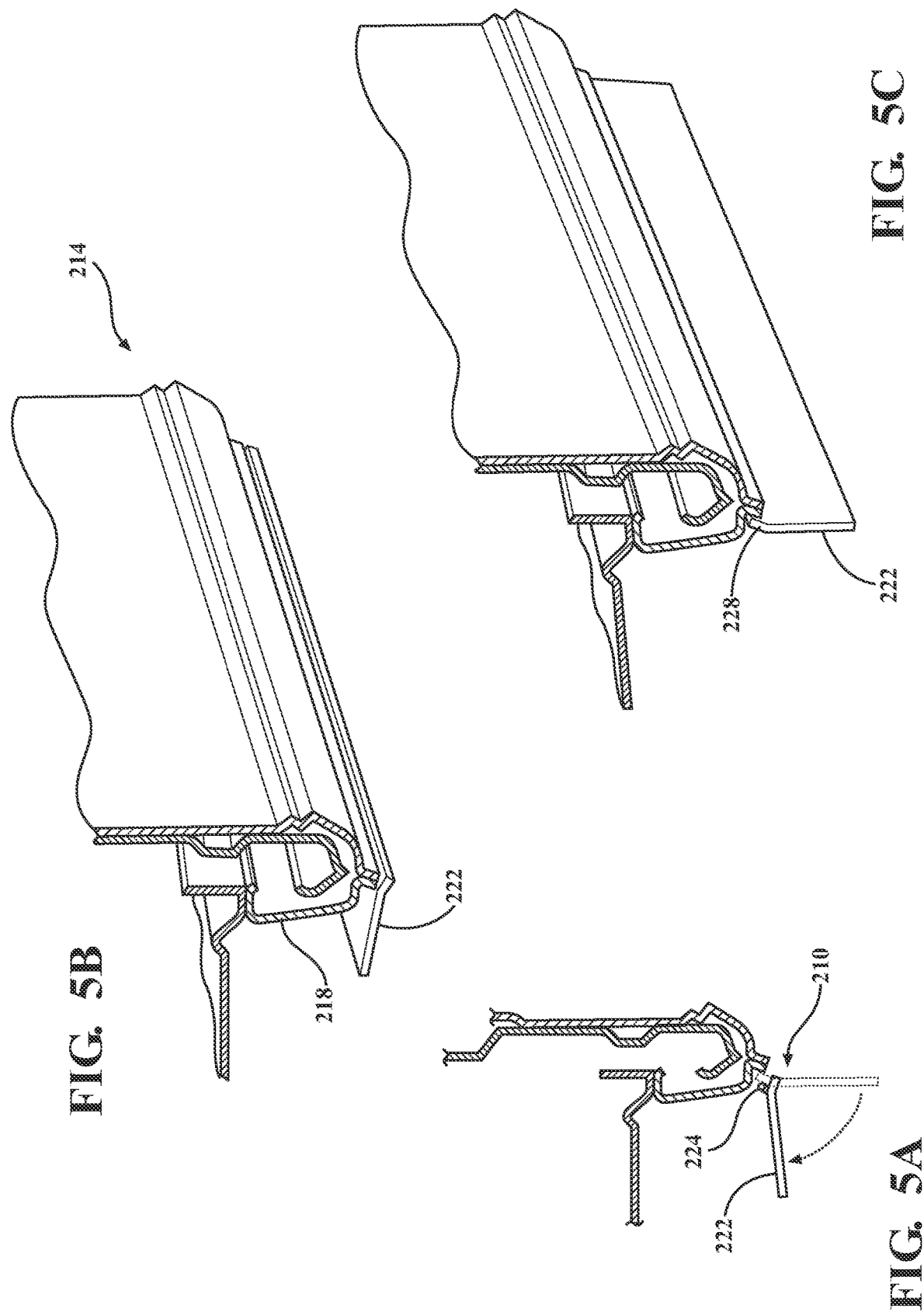

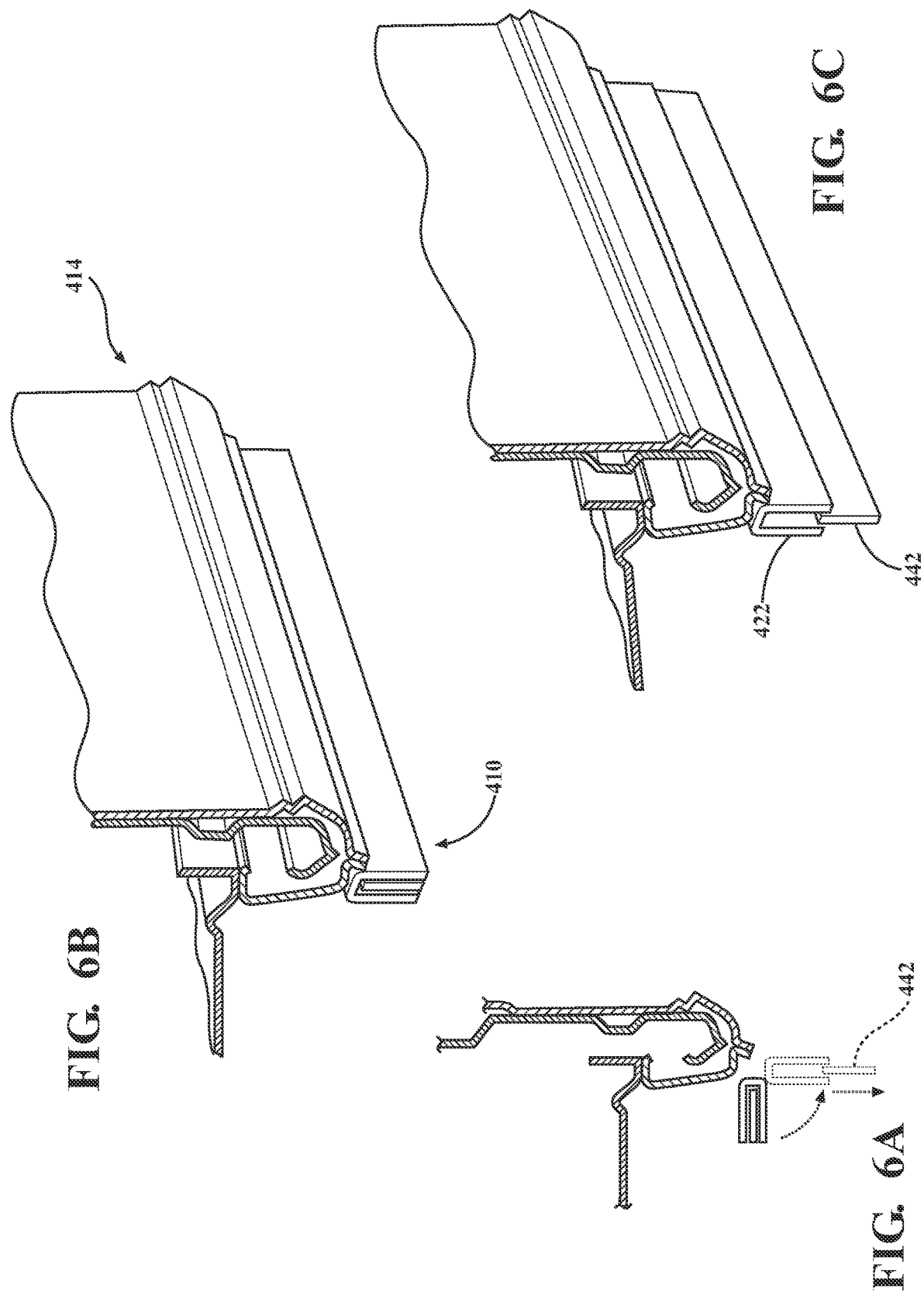

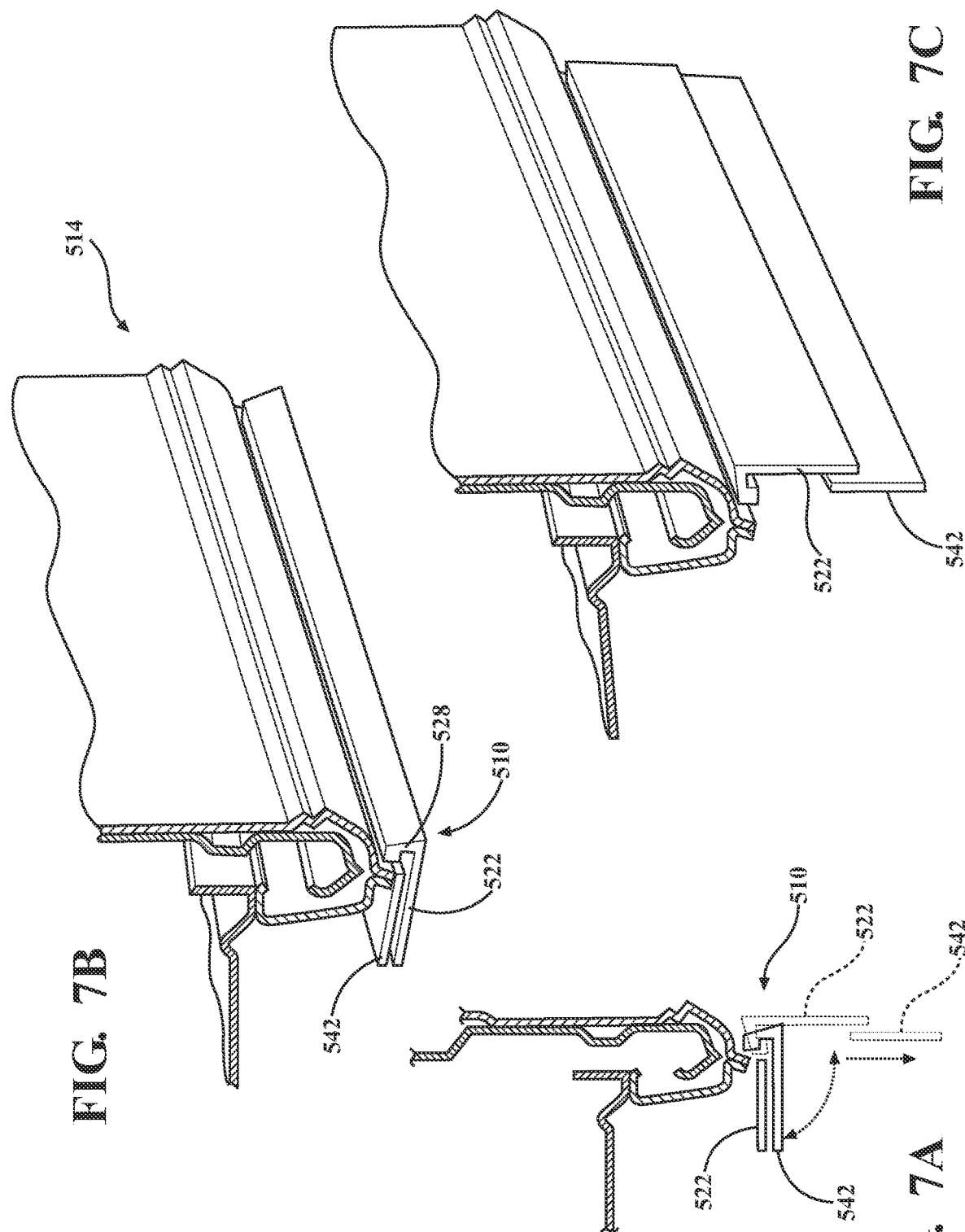

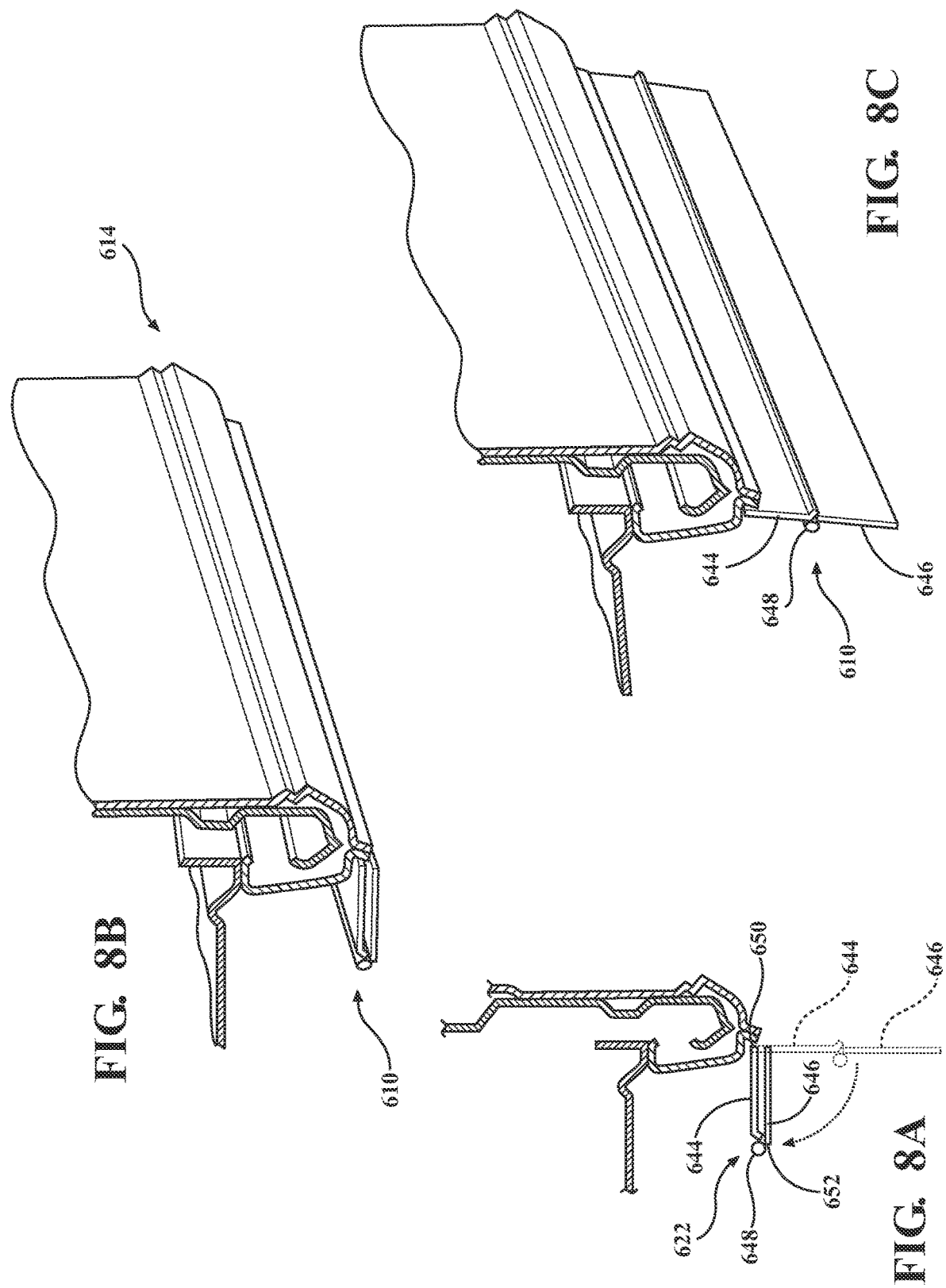

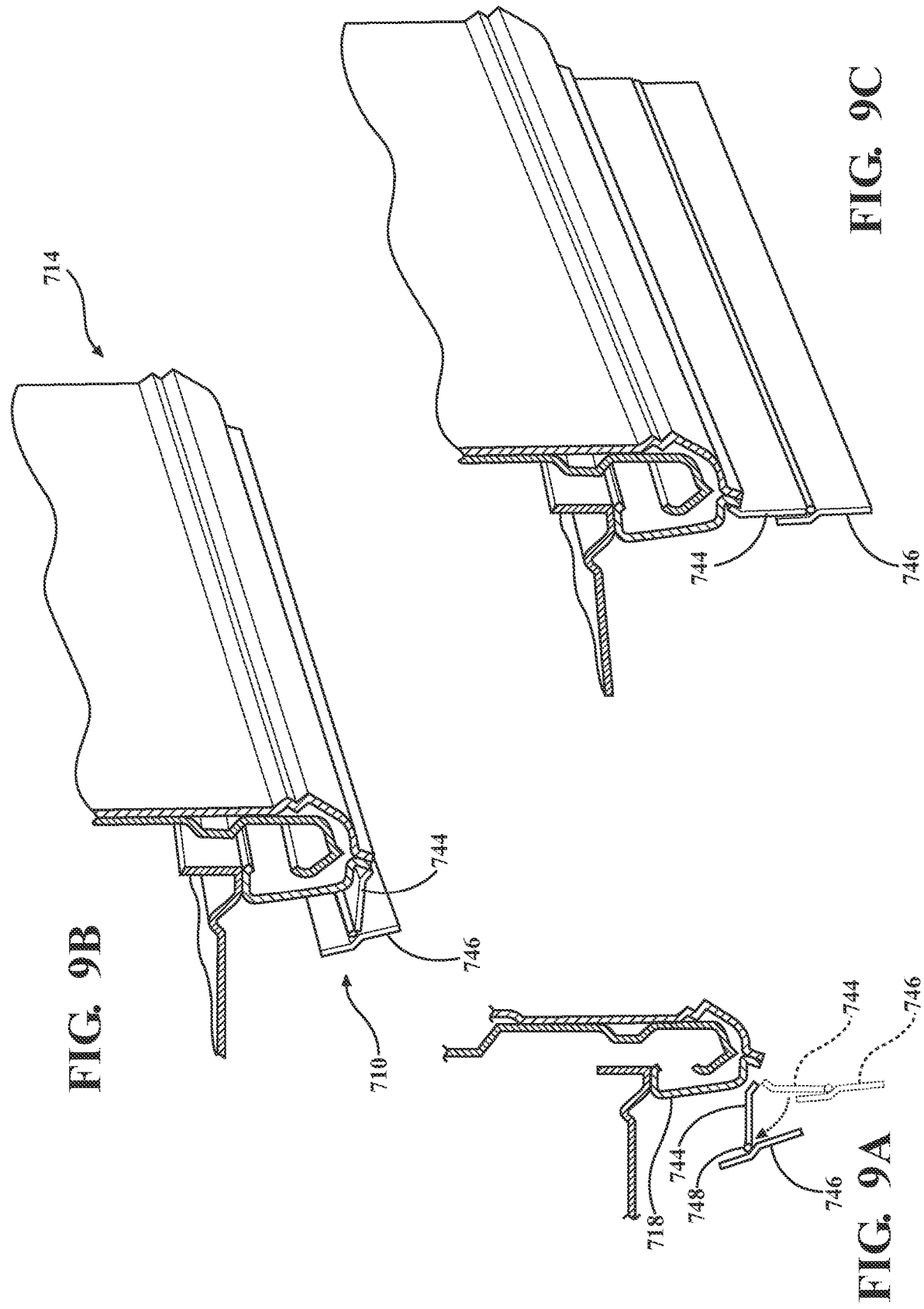

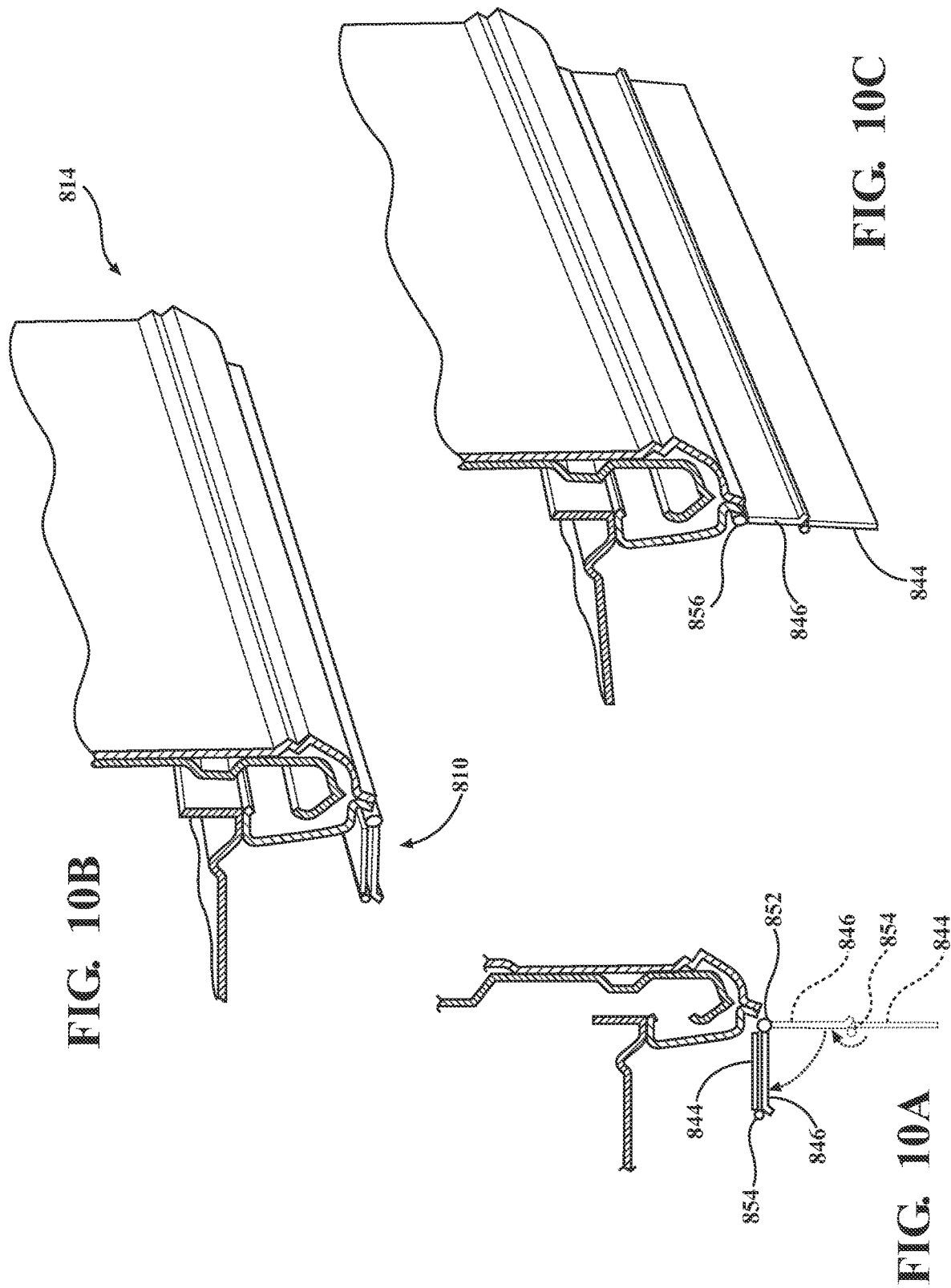

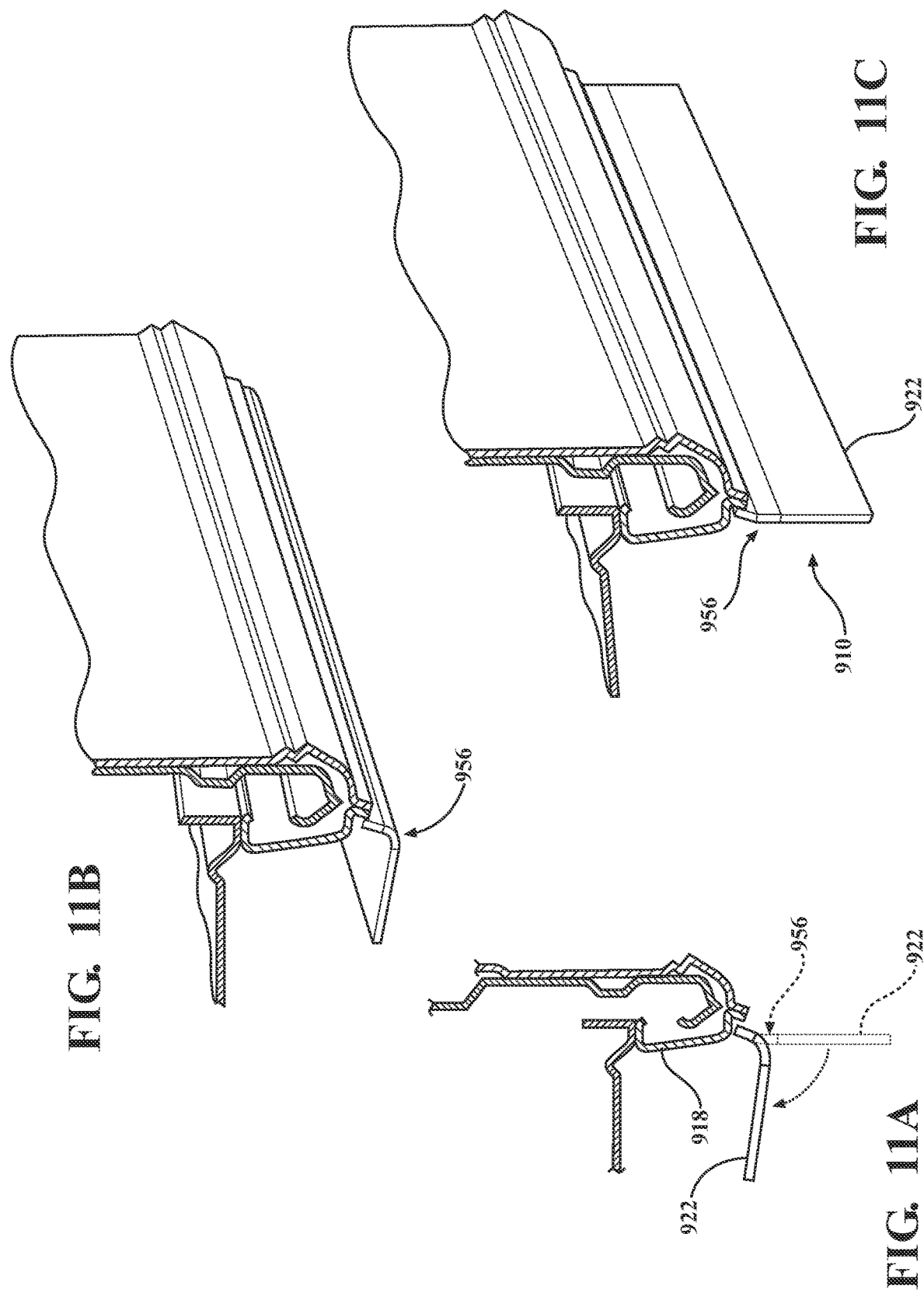

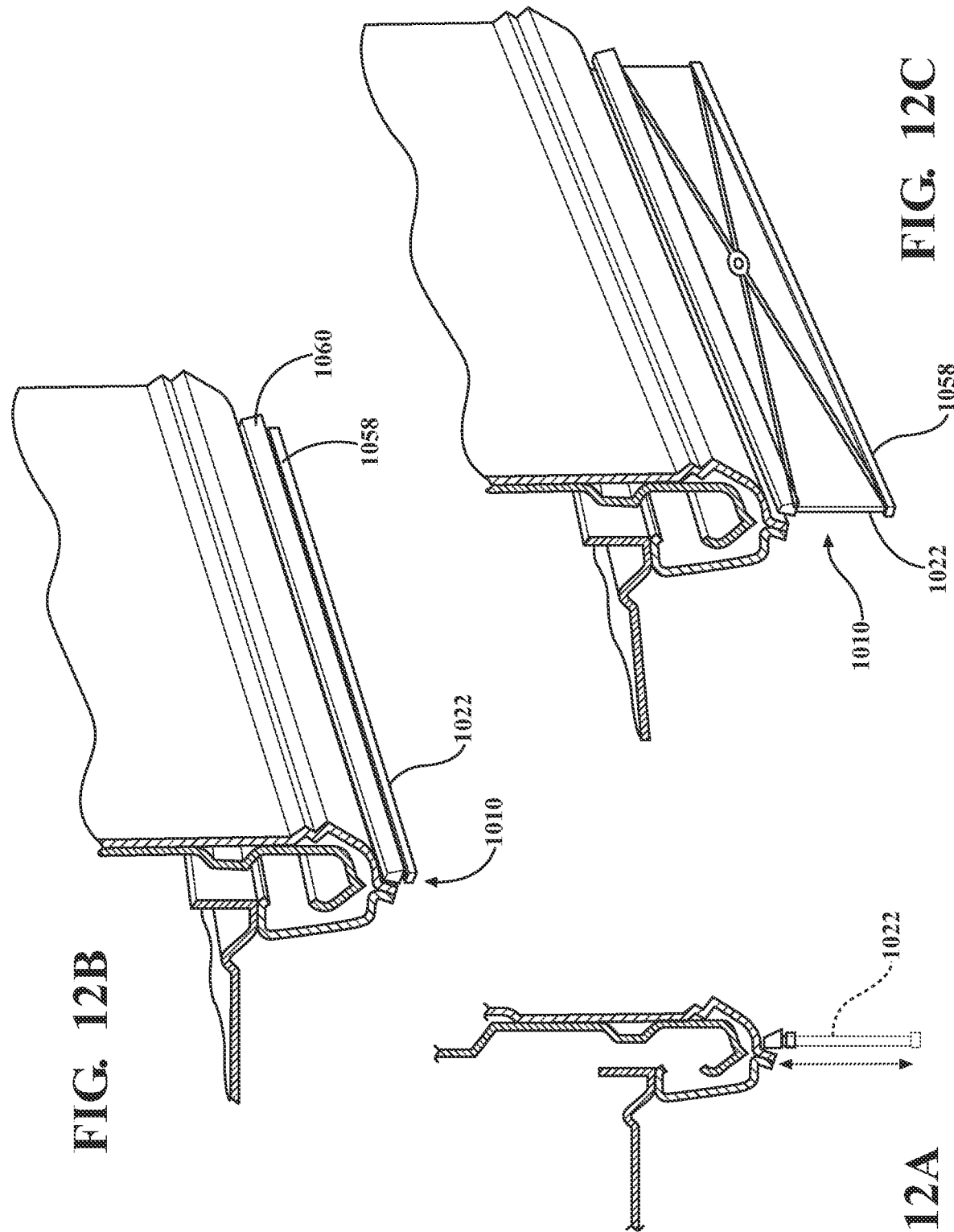

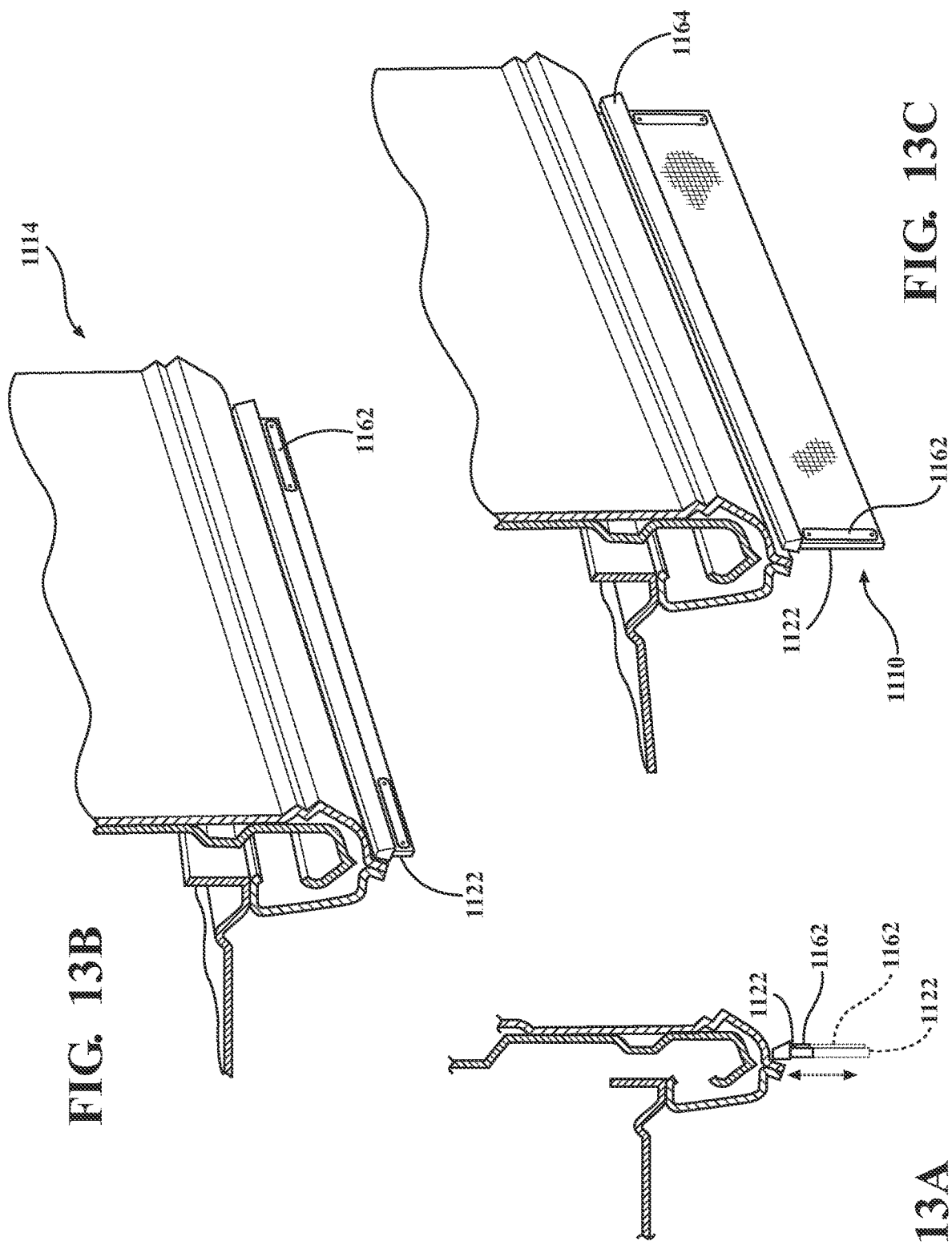

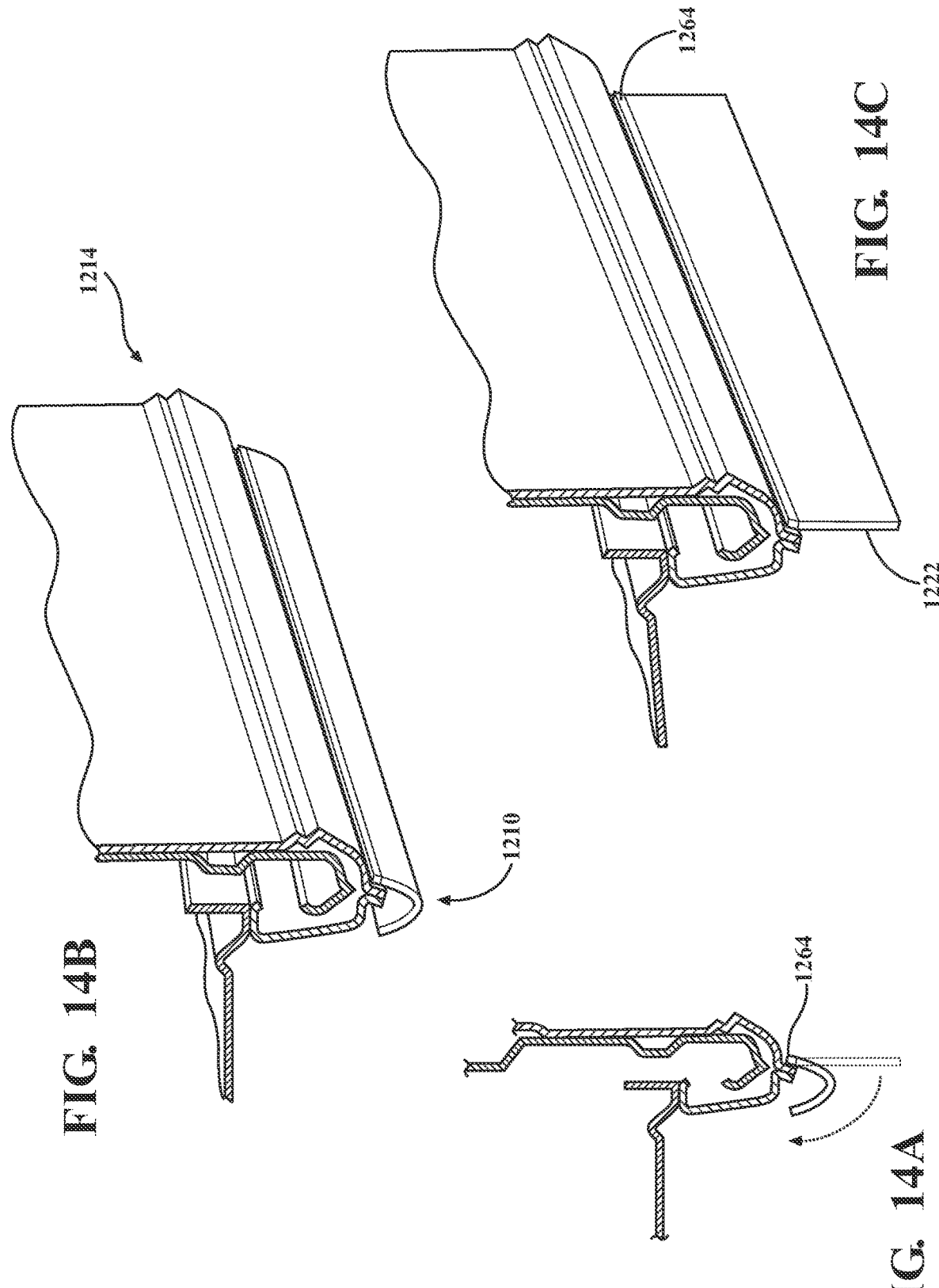

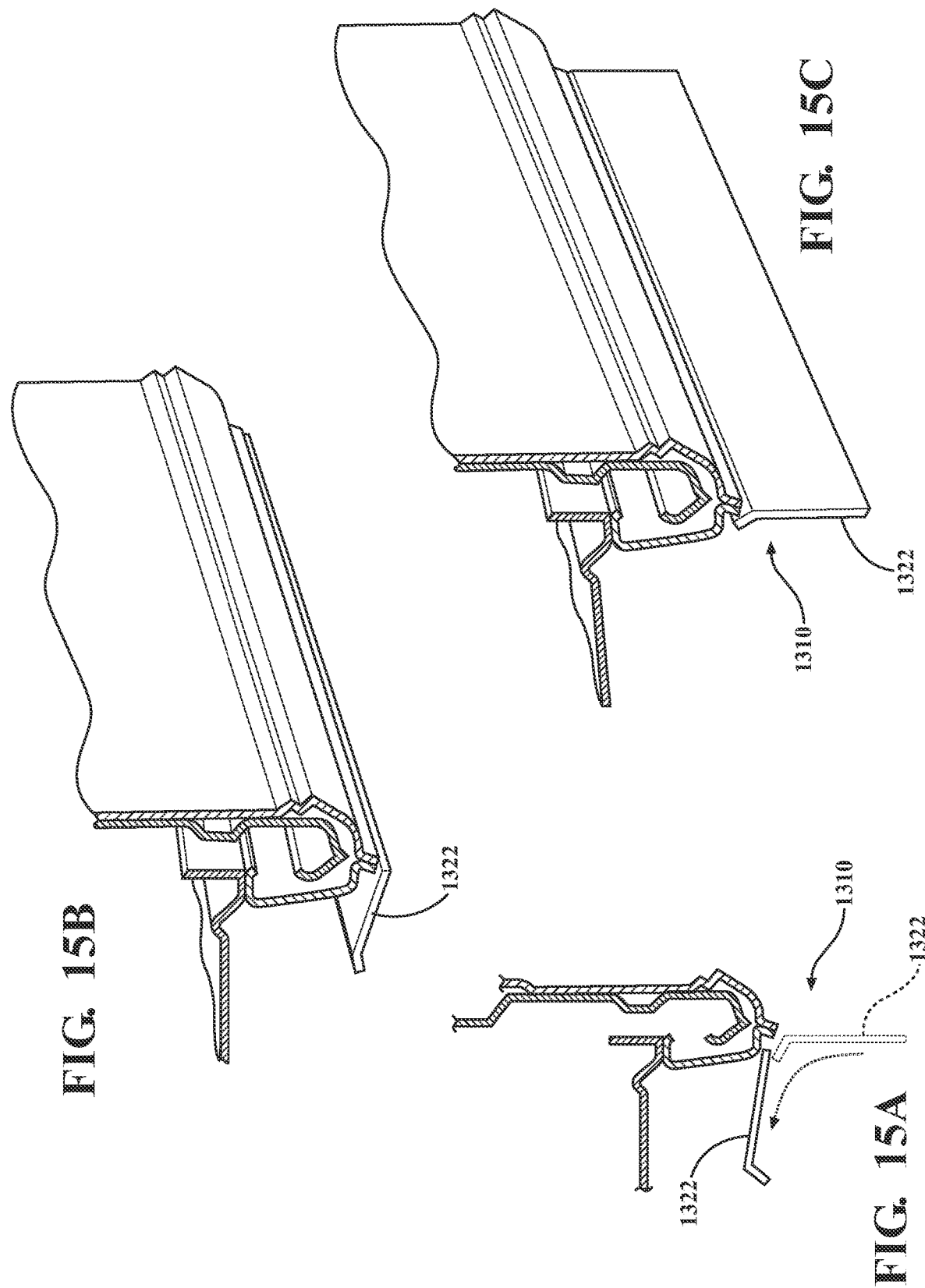

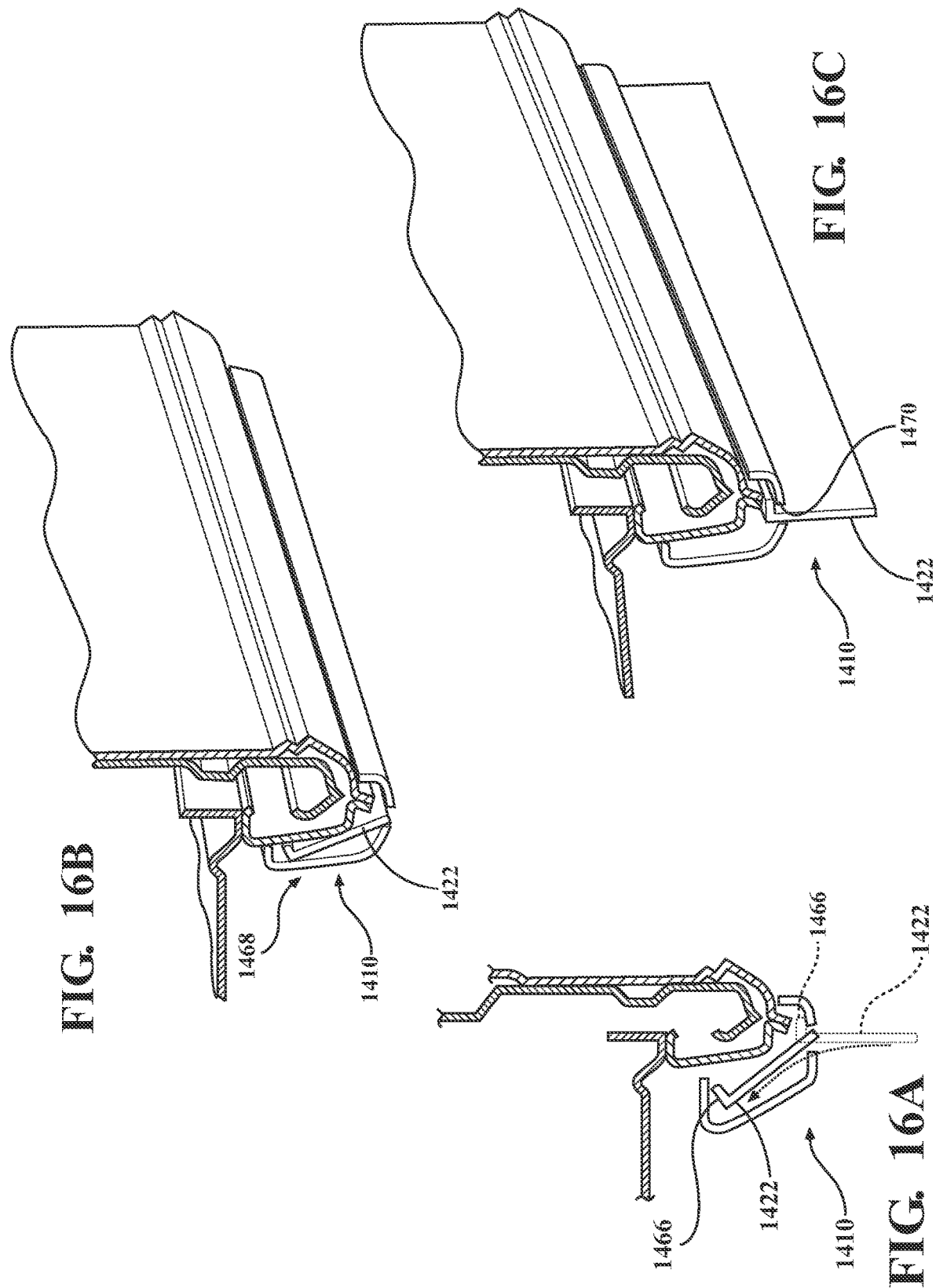

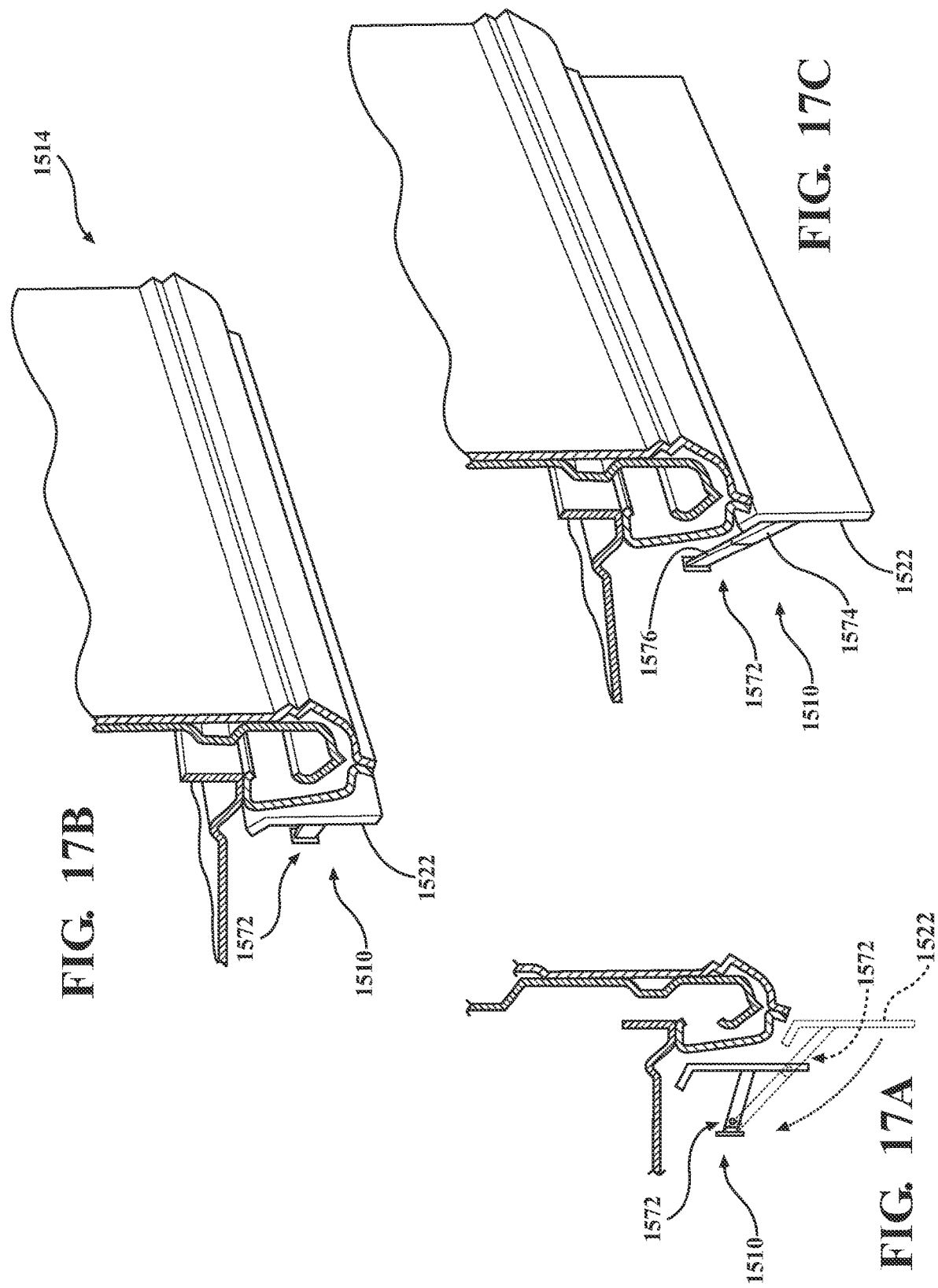

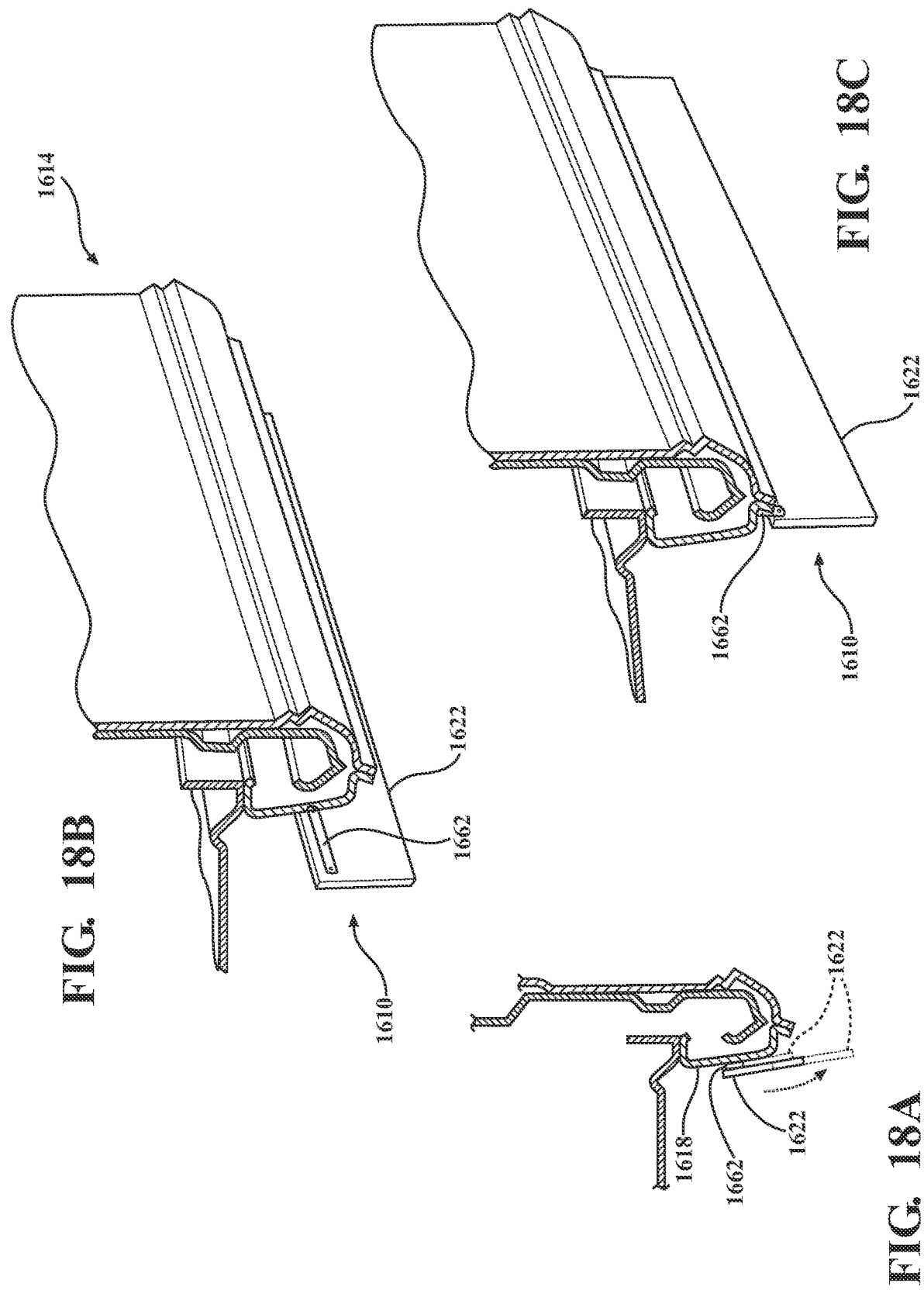

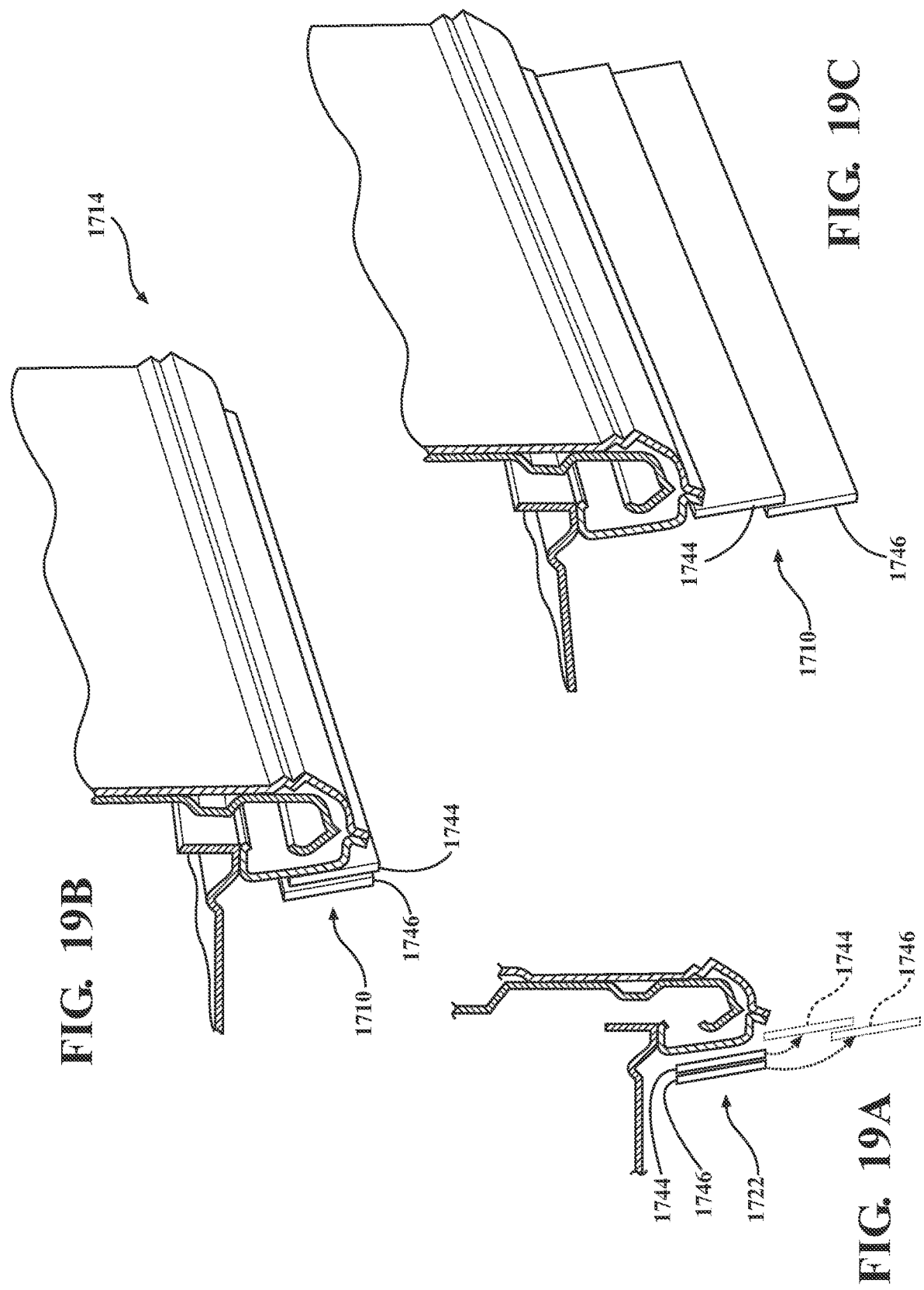

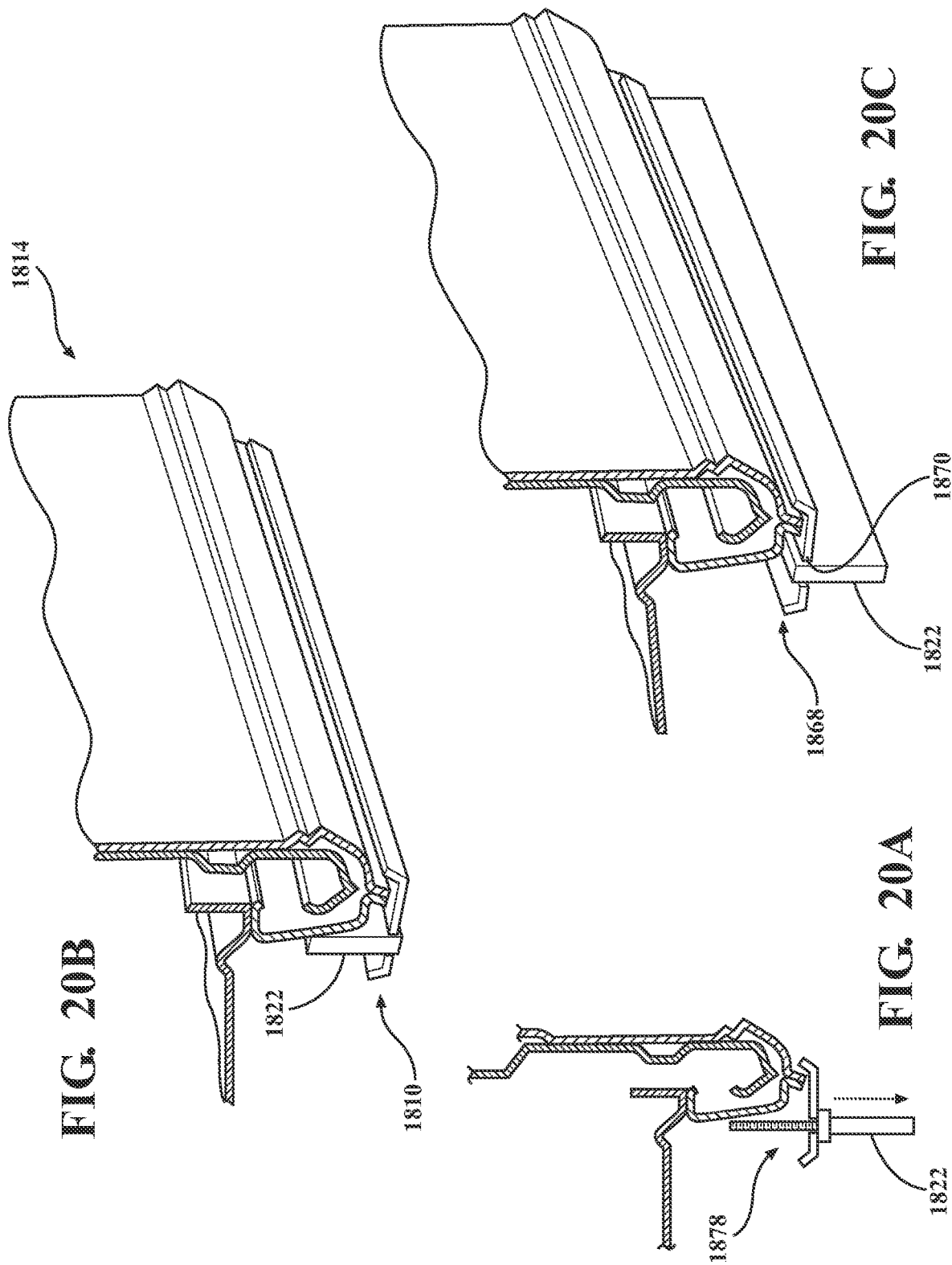

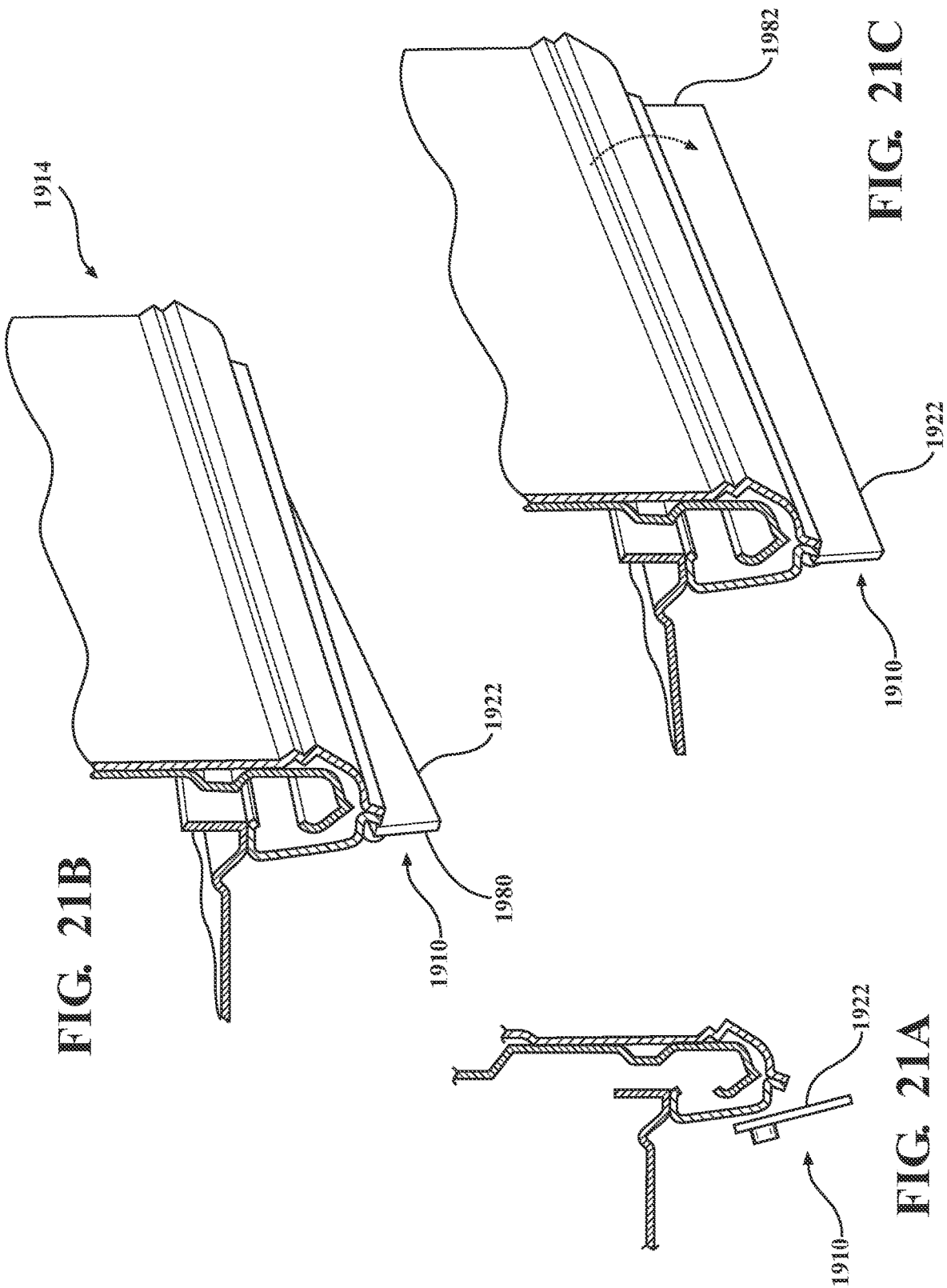

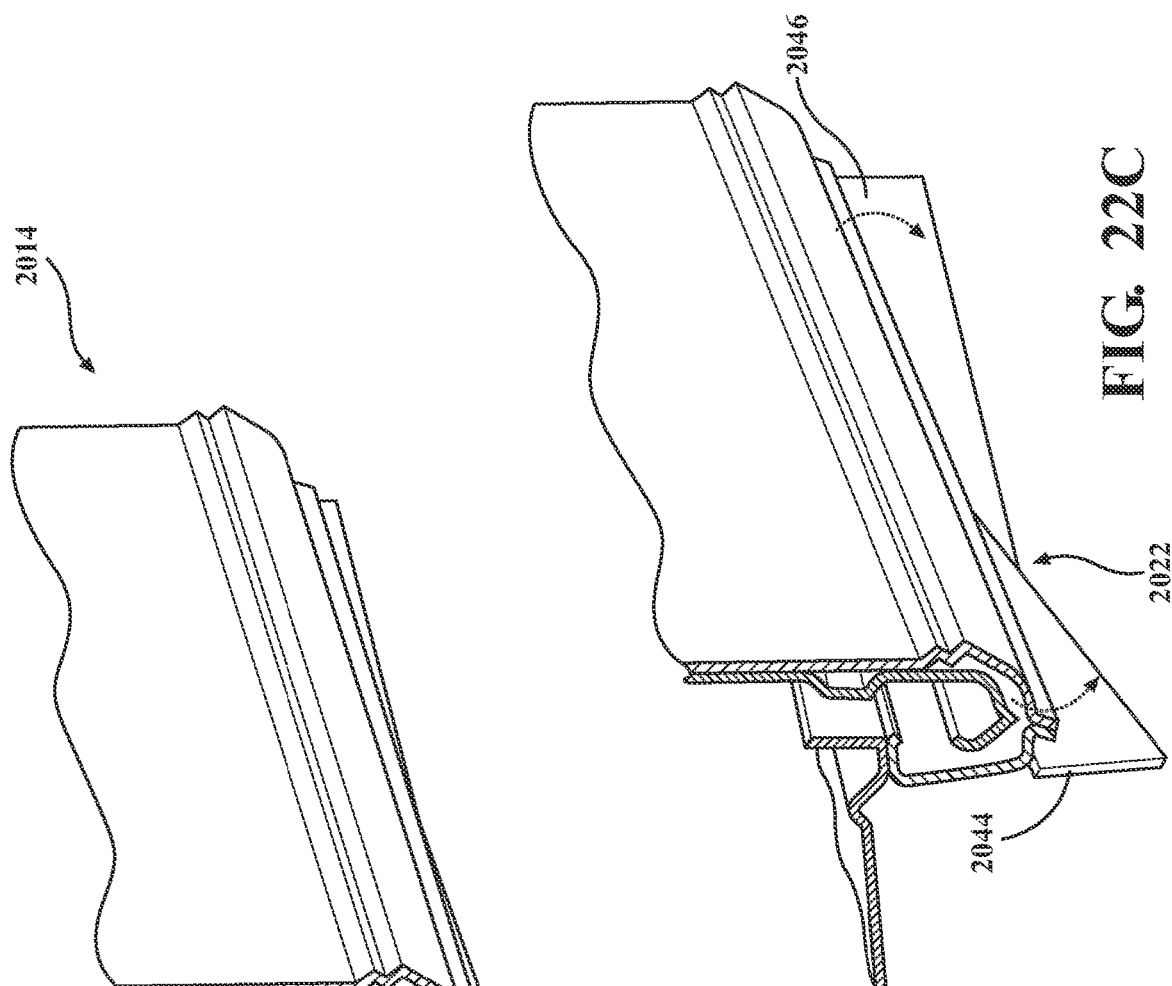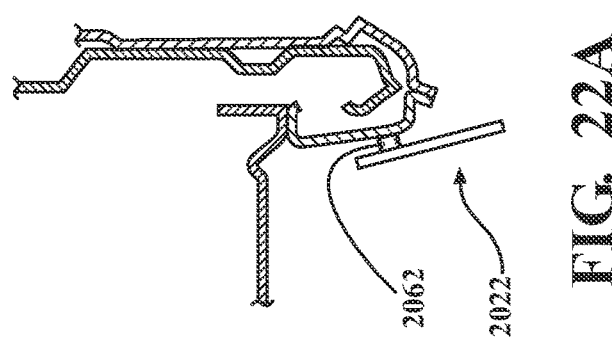

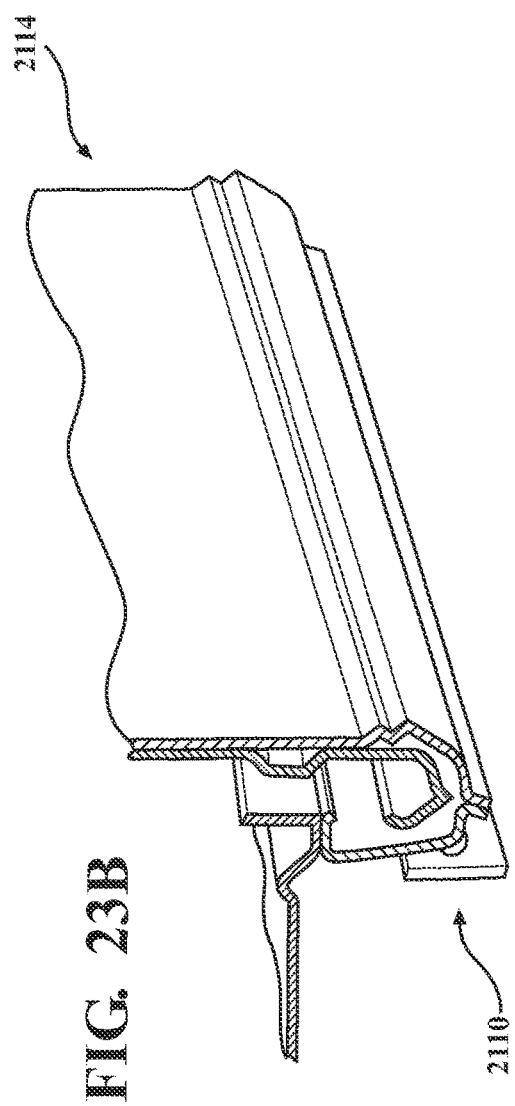
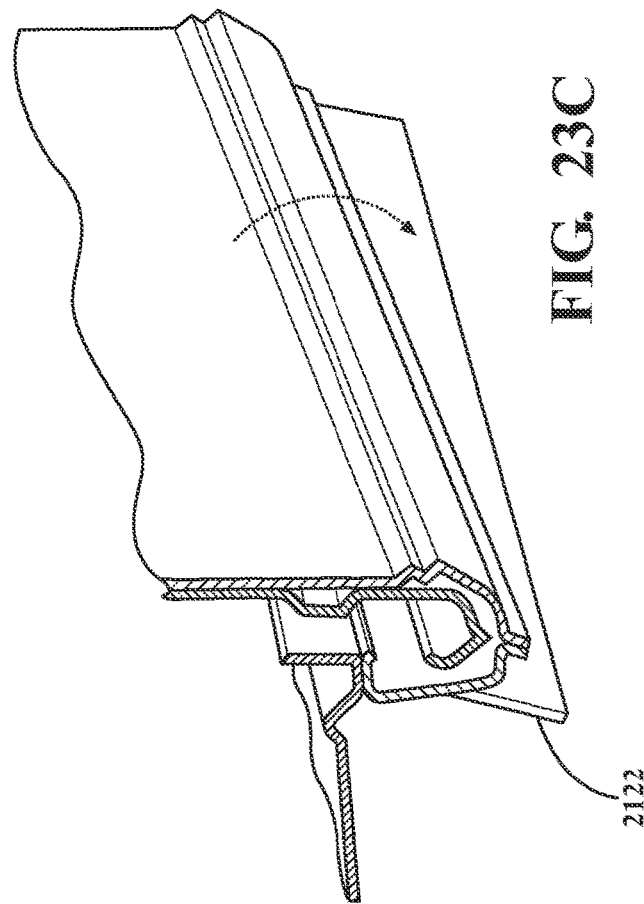
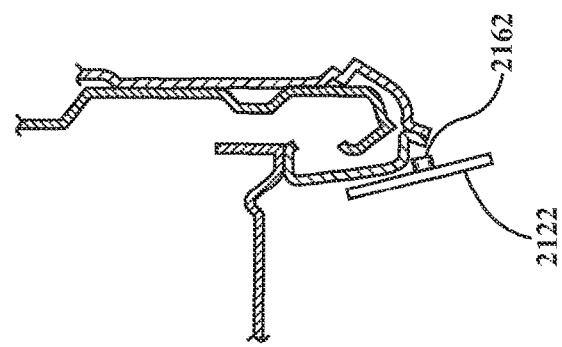
FIG. 23B
FIG. 23C
FIG. 23A

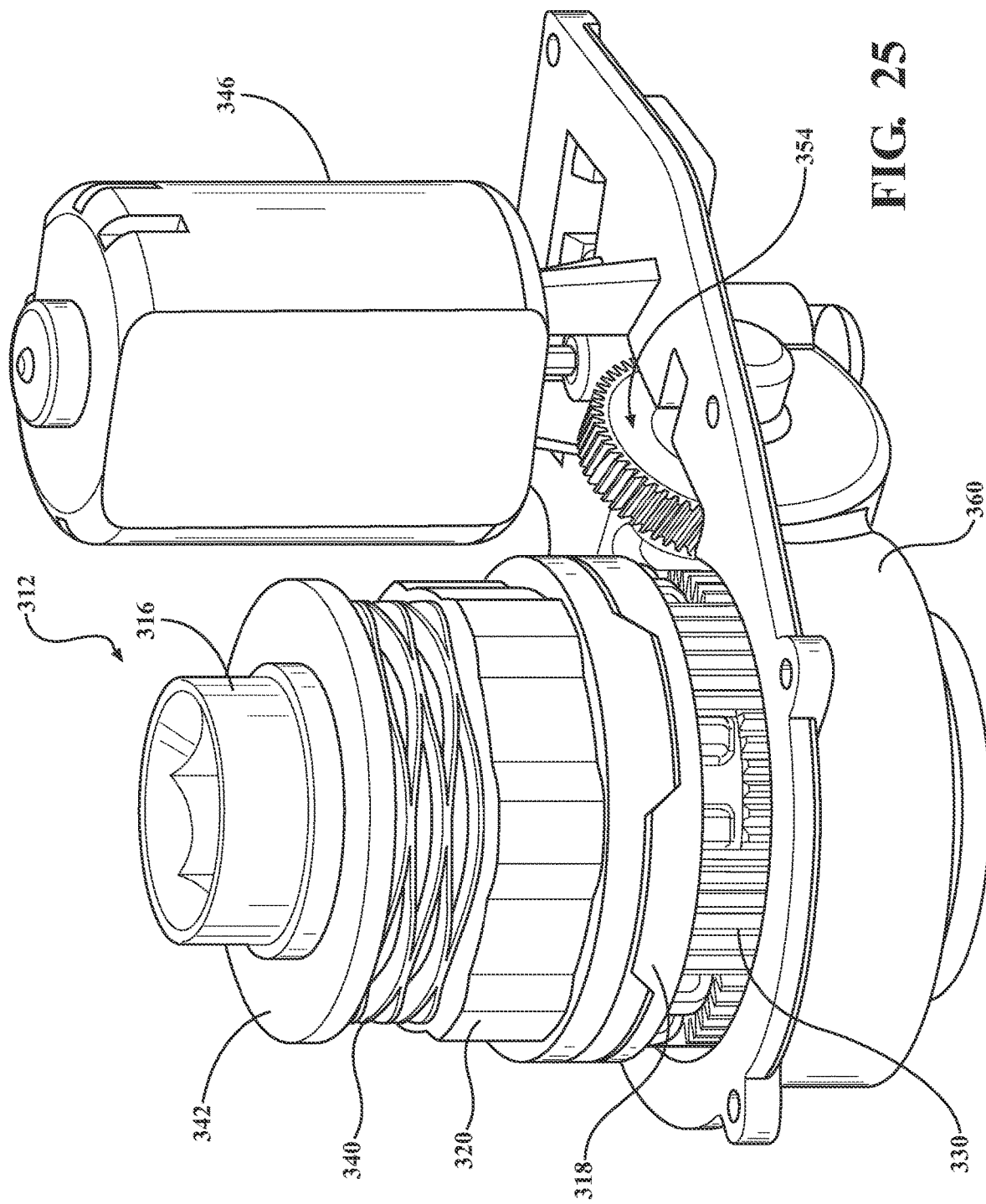

DEPLOYABLE AERODYNAMIC SIDE PANEL SYSTEM

CROSS-REFERENCE TO RELATED APPLICATIONS

This application is a Divisional of U.S. patent application Ser. No. 15/128,023, filed Sep. 21, 2016, which is a National Stage of International Application No. PCT/US2015/021701, filed Mar. 20, 2015, which claims benefit of U.S. Provisional Patent Application No. 61/968,482 filed Mar. 21, 2014. The disclosures of the above applications are incorporated herein by reference.

FIELD OF THE INVENTION

The present invention relates to an active side panel assembly integrated into a side panel for automotive applications.

BACKGROUND OF THE INVENTION

There has been increasing desire to manufacture vehicles that meet or exceed environmental improvement requirements. However, there is a considerable loss of aerodynamic efficiency in vehicles, in particular, vehicles with higher ground clearances such as pickup trucks, sport utility vehicles, and other vehicles, due to the airflow into the underside of the vehicle.

Therefore, having parts with improved aerodynamics has become a well-received option typically effective toward helping to advance standards such as milleage requirements. There are also several other factors that must be considered including aerodynamic load, part weight, cost, ground clearance, complexity and durability.

Typical systems, such as fixed panels, or motorized deployable panels, do not meet requirements. Known systems do not have a proper sealed and clutchable actuator with communication capability and life cycle durability, capabillity for object detection, and are not durable and aerodynamically effective. Typical systems also do not have the ability to detect objects in the event there is an object or ground surface in the way during deployment or object/ground contact while deployed.

Accordingly, there remains a need in the art to provide an automatically deployable structure under predetermined conditions that provides improved arodynamics.

SUMMARY OF THE INVENTION

The present invention is directed to an active side panel assembly having at least one deployable panel that moves between at least a stowed position and a deployed position driven by at least one actuator, such as a sealed, clutchable actuator that has communication capability with the vehicle. The deployable panel improves arodynamics and is part of a rocker panel system/module and/or side vehicle panel/framing. The assembly does not require manual deployment and is only utilized when necessary; at predetermined vehicle speeds under predetermined conditions with no ground surface or object interference.

When the deployable panel is in an extended or deployed position, the deployable panel improves airflow under predetermined conditions, e.g., vehicle speeds in the range of at least 30 miles per hour. When the deployable panel is in a retracted or stowed position, the deployable panel generally folds or otherwise moves out of the way under the vehicle to improve vehicle ground clearance and prevent damage due to ground/terrain/objects in the way during deployment or coming in contact. The active side panel assembly provides a fully deployable system with object detection, declutching to help prevent damage, e.g., to protect the deployable panel under higher predetermined loads, is under the vehicle when stowed for ground clearance and usability, has communication with the vehicle to determine proper deployment and function, and is suitable to meet automotive specifications and functionality.

Utilization of the side panel system that deploys and retracts based on vehicle requirements provides valueable reduction in vehicle drag, thereby reducing emissions and improving fuel economy. Additionally, it allows for the system to retract up adjacent the rocker system/module/frame so the vehicle can still meet ground clearance requirements and reduce or eliminate potential for damage due to contact with objects or the driven ground surface.

BRIEF DESCRIPTION OF THE DRAWINGS

The present invention will become more fully understood from the detailed description and the accompanying drawings, wherein:

FIG. 3A is a broken-away side view schematic of a deployable side panel assembly in an environment of use illustrating a deployable panel rotating between a stowed position and a deployed position, in accordance with the present invention;

FIG. 3B is a broken-away perspective view of the deployable panel of FIG. 3A in the stowed position;

FIG. 3C is a broken-away perspective view of the deployable panel of FIGS. 3A-3B in the deployed position;

FIG. 4A is a broken-away side view schematic of a deployable side panel assembly illustrating a deployable panel rotating between a stowed position and a deployed position, in accordance with a second embodiment of the present invention;

FIG. 4B is a broken-away perspective view of the deployable panel of FIG. 4A in the stowed position;

FIG. 4C is a broken-away perspective view of the deployable panel of FIGS. 4A-4B in the deployed position;

FIG. 5A is a broken-away side view schematic of a deployable side panel assembly illustrating a deployable panel rotating between a stowed position and a deployed position, in accordance with a third embodiment of the present invention;

FIG. 5B is a broken-away perspective view of the deployable panel of FIG. 5A in the stowed position;

FIG. 5C is a broken-away perspective view of the deployable panel of FIGS. 5A-5B in the deployed position;

FIG. 6A is a broken-away side view schematic of a deployable side panel assembly including an integrated slide out deployable panel shown between a stowed position and a deployed position, in accordance with a fourth embodiment of the present invention;

FIG. 6B is a broken-away perspective view of the deployable panel of FIG. 6A in the stowed position;

FIG. 6C is a broken-away perspective view of the deployable panel of FIGS. 6A-6B in the deployed position;

FIG. 7A is a broken-away side view schematic of a deployable side panel assembly including a slidable deployable panel shown between a stowed position and a deployed position, in accordance with a fifth embodiment of the present invention;

FIG. 7B is a broken-away perspective view of the deployable panel of FIG. 7A in the stowed position;

FIG. 7C is a broken-away perspective view of the deployable panel of FIGS. 7A-7B in the deployed position;

FIG. 8A is a broken-away side view schematic of a deployable side panel assembly including a hinged deployable panel shown between a stowed position and a deployed position, in accordance with a sixth embodiment of the present invention;

FIG. 8B is a broken-away perspective view of the deployable panel of FIG. 8A in the stowed position;

FIG. 8C is a broken-away perspective view of the deployable panel of FIGS. 8A-8B in the deployed position;

FIG. 9A is a broken-away side view schematic of a deployable side panel assembly including a hinged deployable panel shown between a stowed position and a deployed position, in accordance with a seventh embodiment of the present invention;

FIG. 9B is a broken-away perspective view of the deployable panel of FIG. 9A in the stowed position;

FIG. 9C is a broken-away perspective view of the deployable panel of FIGS. 9A-9B in the deployed position;

FIG. 10A is a broken-away side view schematic of a deployable side panel assembly including a hinged deployable panel shown between a stowed position and a deployed position, in accordance with a eighth embodiment of the present invention;

FIG. 10B is a broken-away perspective view of the deployable panel of FIG. 10A in the stowed position;

FIG. 10C is a broken-away perspective view of the deployable panel of FIGS. 10A-10B in the deployed position;

FIG. 11A is a broken-away side view schematic of a deployable side panel assembly including a deployable panel with a flexible hinge shown between a stowed position and a deployed position, in accordance with a ninth embodiment of the present invention;

FIG. 11B is a broken-away perspective view of the deployable panel of FIG. 11A in the stowed position;

FIG. 11C is a broken-away perspective view of the deployable panel of FIGS. 11A-11B in the deployed position;

FIG. 12A is a broken-away side view schematic of a deployable side panel assembly including a scissor hinge panel shown between a stowed position and a deployed position, in accordance with a tenth embodiment of the present invention;

FIG. 12B is a broken-away perspective view of the deployable scissor hinge panel of FIG. 12A in the stowed position;

FIG. 12C is a broken-away perspective view of the deployable scissor hinge panel of FIGS. 12A-12B in the deployed position;

FIG. 13A is a broken-away side view schematic of a deployable side panel assembly including a deployable panel of stretchable material shown between a stowed position and a deployed position, in accordance with an eleventh embodiment of the present invention;

FIG. 13B is a broken-away perspective view of the deployable panel of FIG. 13A in the stowed position;

FIG. 13C is a broken-away perspective view of the deployable panel of FIGS. 13A-13B in the deployed position;

FIG. 14A is a broken-away side view schematic of a deployable side panel assembly including a deployable panel of soft material shown between a stowed position and a deployed position, in accordance with an twelfth embodiment of the present invention;

FIG. 14B is a broken-away perspective view of the deployable panel of FIG. 14A in the stowed position;

FIG. 14C is a broken-away perspective view of the deployable panel of FIGS. 14A-14B in the deployed position;

FIG. 15A is a broken-away side view schematic of a deployable side panel assembly including a rollable panel shown between a stowed position and a deployed position, in accordance with a thirteenth embodiment of the present invention;

FIG. 15B is a broken-away perspective view of the deployable panel of FIG. 15A in the stowed position;

FIG. 15C is a broken-away perspective view of the deployable panel of FIGS. 15A-15B in the deployed position;

FIG. 16A is a broken-away side view schematic of a deployable side panel assembly including a housing and a deployable panel, the panel shown between a stowed position and a deployed position, in accordance with a fourteenth embodiment of the present invention;

FIG. 16B is a broken-away perspective view of the deployable panel of FIG. 16A in the stowed position;

FIG. 16C is a broken-away perspective view of the deployable panel of FIGS. 16A-16B in the deployed position;

FIG. 17A is a broken-away side view schematic of a deployable side panel assembly including pivotal linkages connected to a deployable panel, the panel shown between a stowed position and a deployed position, in accordance with a fifteenth embodiment of the present invention;

FIG. 17B is a broken-away perspective view of the deployable panel of FIG. 17A in the stowed position;

FIG. 17C is a broken-away perspective view of the deployable panel of FIGS. 17A-17B in the deployed position;

FIG. 18A is a broken-away side view schematic of a deployable side panel assembly including rotatable bracket members connected to a deployable panel, the panel shown between a stowed position and a deployed position, in accordance with a sixteenth embodiment of the present invention;

FIG. 18B is a broken-away perspective view of the deployable panel of FIG. 18A in the stowed position;

FIG. 18C is a broken-away perspective view of the deployable panel of FIGS. 18A-18B in the deployed position;

FIG. 19A is a broken-away side view schematic of a deployable side panel assembly including a deployable panel including an integrated slide out panel, the panel shown between a stowed position and a deployed position, in accordance with a seventeenth embodiment of the present invention;

FIG. 19B is a broken-away perspective view of the deployable panel of FIG. 19A in the stowed position;

FIG. 19C is a broken-away perspective view of the deployable panel of FIGS. 19A-19B in the deployed position;

FIG. 20A is a broken-away side view schematic of a deployable side panel assembly including a screw threaded member and a deployable panel, the panel shown between a stowed position and a deployed position, in accordance with an eighteenth embodiment of the present invention;

FIG. 20B is a broken-away perspective view of the deployable panel of FIG. 20A in the stowed position;

FIG. 20C is a broken-away perspective view of the deployable panel of FIGS. 20A-20B in the deployed position;

FIG. 21A is a broken-away side view schematic of a deployable side panel assembly with a deployable panel shown in a deployed position, in accordance with a nineteenth embodiment of the present invention;

FIG. 21B is a broken-away perspective view of the deployable panel of FIG. 21A in the stowed position;

FIG. 21C is a broken-away perspective view of the deployable panel of FIGS. 21A-21B in the deployed position;

FIG. 22A is a broken-away side view schematic of a deployable side panel assembly a deployable hinged sail panel shown in a deployed position, in accordance with a twentieth embodiment of the present invention;

FIG. 22B is a broken-away perspective view of the hinged sail panel of FIG. 22A in the stowed position;

FIG. 22C is a broken-away perspective view of the hinged sail panel of FIGS. 22A-22B in the deployed position;

FIG. 23A is a broken-away side view schematic of a deployable side panel assembly with a deployable panel shown in a deployed position, in accordance with a twenty first embodiment of the present invention;

FIG. 23B is a broken-away perspective view of the deployable panel of FIG. 23A in the stowed position;

FIG. 23C is a broken-away perspective view of the deployable panel of FIGS. 23A-23B in the deployed position;

FIG. 25 is a perspective view of the actuator of FIG. 24 without the housing for clarity.

DETAILED DESCRIPTION OF THE PREFERRED EMBODIMENTS

Figure 1:
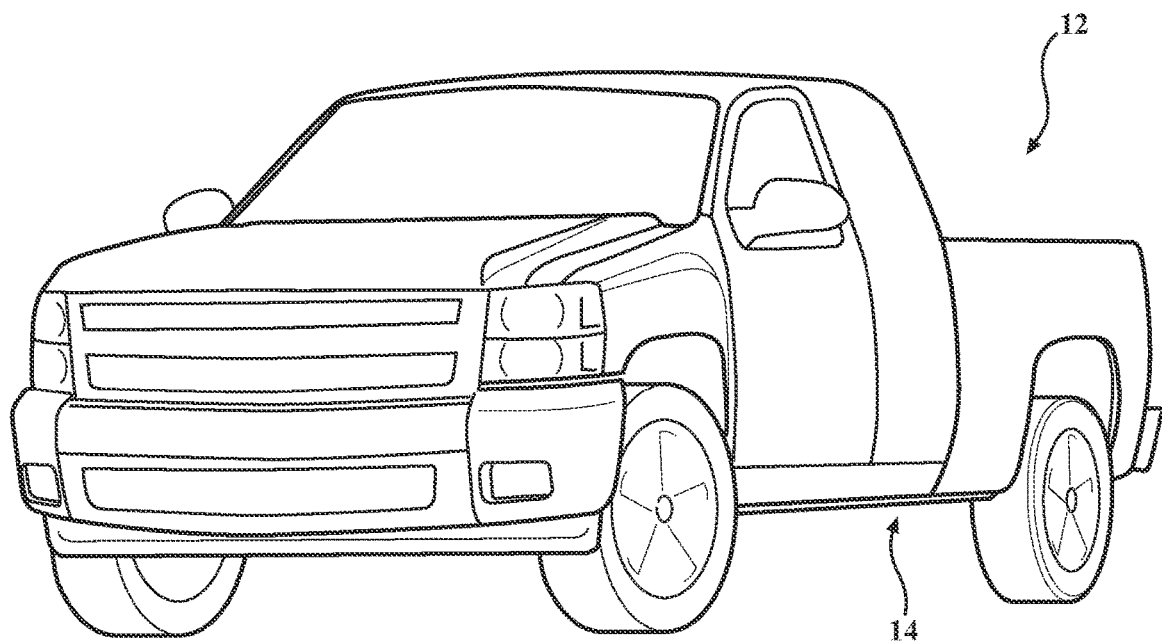
FIG. 1 is a perspective view of a vehicle with a deployable side panel assembly in a stowed position.

The following description of the preferred embodiment(s) is merely exemplary in nature and is in no way intended to limit the invention, its application, or uses.

Referring to FIGS. 1-3C generally, in accordance with the present invention, there is provided an active side panel assembly generally shown at 10 for a vehicle 12. The active side panel assembly 10 is movable between a stowed position and a deployed position, and the assembly 10 is operably supported and connected to a rocker panel assembly 14 portion of the vehicle 12 such that the assembly 10 is able to deploy and retract automatically under predetermined conditions.

Generally, the rocker panel assembly 14 includes at least one outer rocker panel 16 and inner rocker panel 18 with an inner reinforcement panel 20 therebetween. The rocker panel 14 is located along the lower side of the vehicle 12 between wheel wells and/or between the front wheel well and front of cargo bed. The assembly 10 is operably connected to vehicle framing and/or the rocker panel assembly 14 of the vehicle 12 using a nut and bolt combination, however, it is within the scope of the invention that other fasteners, such as rivets, or in combination with a plurality of attachment brackets may be used as well.

The active side panel assembly 10 includes at least one deployable panel 22 rotatably connected to the vehicle 12. Typically, the panel 22 is moveable between at least a deployed position and a stowed position. However, depending on the application the deployable panel 22 is slidable, extendable, articulatable, stackable, pivotable, rollable, elevatable, inflatable, foldable, collapsible, stretchable, translatable, combinations thereof or otherwise connected and deployable in the side panel 20 area depending on the application.

A pair of hinges 24 are connected toward a lower edge 26 of the rocker panel assembly 14, e.g., inner rocker panel 18, to the first end 28 of the deployable panel 22. The panel 22 is adapted for attachment to the pair of hinges 24 which can be any hinge arrangement suitable for predetermined cycling and durability requirements. Typically, the lower edge 26 region has a 'U' shaped cross-section, cutout or notch and each hinge is fastened in the region, e.g., directly or by way of a fastener or pin going through diverging side walls of the cutout. However, depending on the application hinges are bolted, screwed, welded, riveted, secured with adhesive and/or epoxy, combinations thereof or otherwise connected to the panel 22 and rocker panel assembly 14 and/or other framing or chassis member(s) depending on the application. Alternatively, molded-in panel features which are used to attach to opposing vehicle features and/or in combination with at least one fastener for each hinge or the like may be used to pivotally secure the panel 22 to the vehicle 12 and allow deployment of the panel 22.

The first end 28 of the deployable panel 22 has a predetermined length and is angled suitably for providing clearance with the rocker panel assembly 14 and cycling the integrally formed distal end portion 36 of the deployable panel 22 from the deployed, e.g., generally vertical, to stowed, e.g., generally horizontal, positions.

At least one actuator 30 is connected to a respective drive shaft 32 operably coupled to the deployable panel 22. Generally, the actuator 30 is sealed within the rocker panel assembly 14 or other vehicle structure to afford further protection from impact and/or the environment. Typically, the actuator 30 is embedded within the rocker panel assembly 14 or other vehicle structure to rotate the panel 22 up/down. Preferably, the actuator 30 and drive shaft 32 are enclosed within the rocker panel assembly 14 between the outer panel 16 and inner panel 18, generally centrally located toward the lower end of the rocker panel assembly 14 (See FIG. 2 indicated in phantom). Preferably, one actuator 30 and a single driving rotating shaft is used and rotates the panel 22 up/down. Optionally, access panels may be provided for servicing and maintenance of the actuating arrangement.

Figure 2:
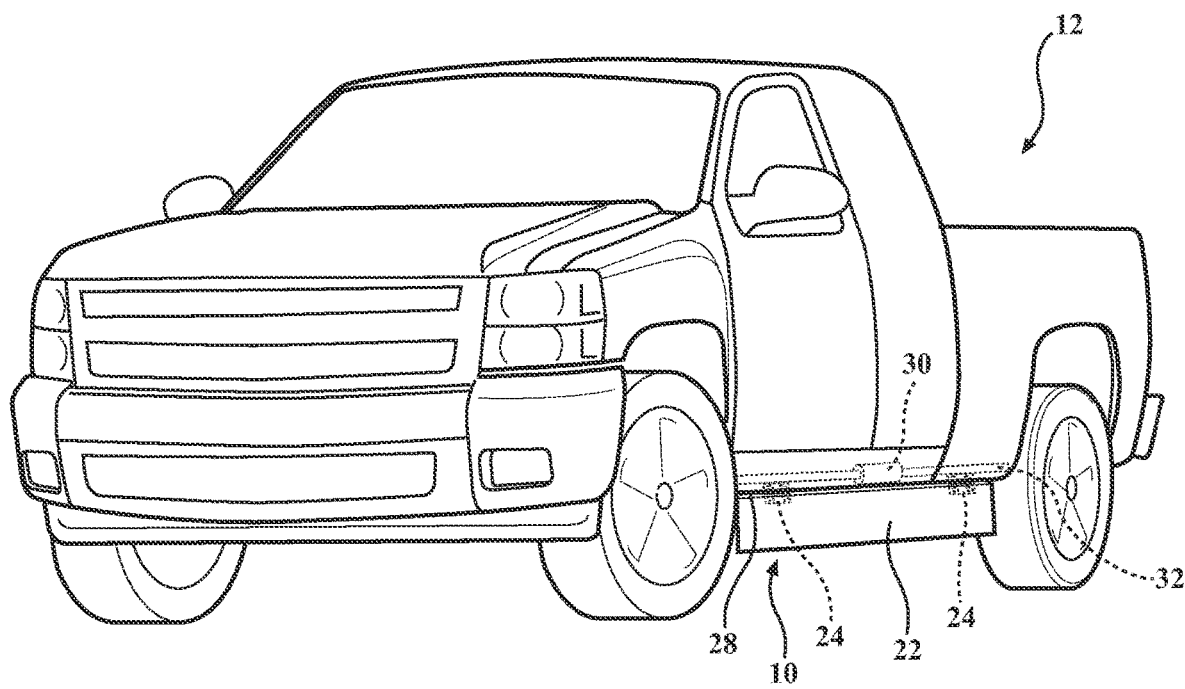
FIG. 2 is a perspective view of the vehicle with the deployable side panel assembly shown in a deployed position, in accordance with the present invention.

The actuator 30 rotates the drive shaft 32 to drive the panel 22 downward and forward during deployment of the panel 22 to the deployed position (see FIGS. 2, 3C). When the active side panel assembly 10 is in the extended/down or deployed position, the deployable panel 22 improves airflow.

The actuator 30 also rotates the drive shaft 32 in the opposite direction to move the panel 22 upward and rearward out of the way to the stowed position (see FIGS. 1, 3B, 3A), e.g., generally horizontal. When the active side panel assembly 10 is in the retracted/up or stowed position, the deployable panel 22 is folded up under the vehicle.

When the active side panel assembly 10 is the stowed position, the deployable panel 22 generally moves or folds out of the way under the vehicle to increase ground clearance. Optionally, the first extending panels can retract and extend in and out of a hollow portion of the respective frame, more preferably, retract and extend from an open area or gap between underbody components under the vehicle. Optionally, an additional panel or other existing structural member can be provided under the vehicle 12 with a depression or the like having a predetermined depth formed therein and sized to receive at least part of the panel 22 within the depression when in the stowed position to further help prevent contact with the stowed panel 22 by objects and ground surface.

The actuator 30 is a rotary actuator, e.g., with feedback options, hex-type, screw-type drive, higher speed actuator, electric, mechanical, linear, e.g., with current override circuits, declutching, hydraulic, pneumatic, extending, power lift actuator, or any other actuators and combinations thereof depending on the application and predetermined vehicle needs.

In a preferred embodiment, the actuator 30 has internal clutching that reacts to certain conditions by de-clutching or disengaging gears allowing the deployable panel 22 to stop deployment to help prevent damage to the active deployable panel 22. Upon impact to the deployable panel 22, e.g., by a ground surface or object on the ground, the actuator 30 will clutch to disengage the gearing so that the deployable panel 22 can move freely out of the way. The actuator 30 itself does not move out of the way upon impact to the deployable panel 22. In the event there is ground/terrain/objects in the way during deployment of the panel 22, the actuator 30 can clutch to disengage the gearing or the actuator 30 can retract the deployable panel 22 back to the stowed position. Typically, the actuator 30 senses current spikes and causes the actuator 30 to react to certain conditions, e.g., sensing of objects hitting the deployable panel 22 induces the actuator 30 to disengage the gearing.

The actuator 30 is generally sealed and has communication capability with the vehicle 12. The actuator 30 and the vehicle 12 also communicate to deploy and retract the deployable panel 22 based upon predetermined conditions such as vehicle speed, wind direction, e.g., average wind direction is unfavorably about 5° yaw, etc. By way of example, the deployable panel 22 is stowed under vehicle 12 and when the vehicle 12 reaches a predetermined speed, e.g., about 30-40 mph, the deployable panel 22 folds downward to the deployed position and stays down until the vehicle drops back down to below the predetermined speed or other predetermined conditions for continued deployment are no longer met.

When the deployable panel 22 is up in the stowed position it is extended partially under the vehicle 12. Generally, extending 4 to 12 inches, typically, 5 to 10 inches, preferably, 5 to 8 inches.

When the deployable panel 22 is down in the deployed position it is extended generally about one quarter to one half of the distance to the traversed ground surface, preferably, about one third of the distance.

When the deployable panel 22 is down in the deployed position it is generally extending vertically, and prevents air from swirling under the vehicle and reduces drag. Typically, the panel 22 is extended to about 90°, traverse to the underside of the vehicle, such that the panel 22 is along the same vertical plane as the vehicle 12 side panel to help prevent air from ducking under the vehicle 12 where it is turbulent due to all of the components under the vehicle 12. Alternatively, the panel 22 is angled inward, e.g., generally, zero to 60 degrees under vertical, typically, five to thirty degrees, preferably, fifteen to thirty degrees, most preferably, five to fifteen degrees maximum. In accordance with a most preferred embodiment, the panel 22 is not at an angle when in the deployed position.

Both ends 34 of the formed panel 22 are generally straight. Depending on the particular application, the ends 34 have different profiles without departing from the scope of the invention.

The active side panel assembly 10 is depicted located on the driver side of the vehicle 12 generally extending along the bottom edge of the vehicle from behind the front wheel well to the front of the rear wheel well. Another active side panel assembly 10 is symmetrical located on the passenger side of the vehicle 12. Both active side panel assemblies 10 are synchronized such that they extend and retract in unison under predetermined conditions.

Figure 24:
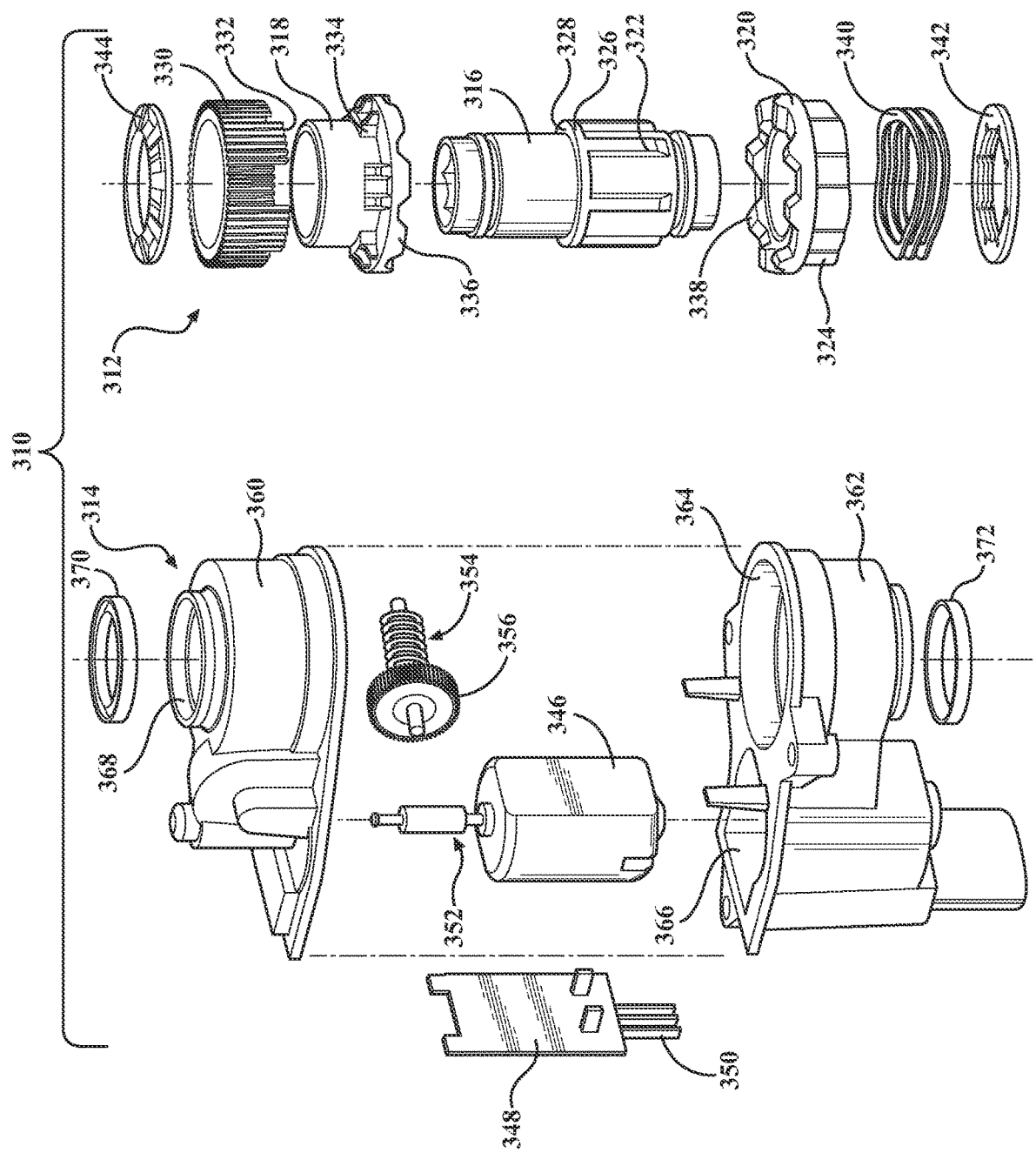
FIG. 24 is an exploded view of an exemplary actuator with internal clutching for deploying/stowing the active side panel assembly, in accordance with the present invention.

Referring generally to FIGS. 24-25, the actuator 30 used in any embodiment can be declutchable. An exemplary actuator assembly with internal clutching is shown generally at 310, comprising a clutch system, generally shown at 312, as will be explained in further detail below. Generally, there is provided a sealed actuator with internal clutching assembly in accordance with the present invention which provides desirable higher cycle durability and capability combined with a water tight arrangement for use, by way of example, in underbody environments exposed to the elements. The sealed actuator with internal clutching assembly further provides a safety override clutch system which allows the actuator to rotate under predetermined conditions, e.g., predetermined high loads, to help protect a motor and other components of the actuator with internal clutching assembly, as will be explained in greater detail below. When subjected to abnormal loads or a predetermined amount of force or other predetermined conditions, the actuator with internal clutching assembly will move features out of the way to help prevent damage thereto.

Referring to FIGS. 4A-4C generally, in accordance with a second embodiment of the present invention, an active side panel assembly generally shown at 110 for a vehicle is identical to the first embodiment except that the deployable panel 122 is rotatably connected to an intermediary fixed panel 138 operably connected to the rocker panel assembly 114. Just as with the first embodiment, the deployable panel 122 is rotated down/up by the at least one actuator between a deployed position and stowed position. However, the deployable panel 122 is hinged under the intermediary fixed panel 138 such that when stowed, the deployable panel 122 is under and behind the fixed panel 138. In particular, the deployable panel is under a distal end portion 136 of the fixed panel 138 and behind a lower depending flange 140 of the fixed panel such that when stowed the deployable panel 122 is not seen from the side of the vehicle. The intermediary fixed panel 138 also has an upward depending portion 140, both the lower and upper depending portions 138,140 extending at a predetermined angle. When driven to the deployed position, the deployable panel 122 rotates downward and the upper end of the panel 122 remains behind the angled lower depending portion 138 of the fixed panel.

When in the deployed position the panel 122 is angled inward, e.g., generally, 15 to 60 degrees under vertical, typically, five to thirty degrees, preferably, fifteen to thirty degrees, most preferably, five to fifteen degrees maximum.

Referring to FIGS. 5A-5C generally, in accordance with a third embodiment of the present invention, an active side panel assembly generally shown at 210 for a vehicle is identical to the first embodiment except that the deployable panel 222 is rotatably connected to the inner rocker panel 218 by at least a pair of hinges 224. The first end 228 of the deployable panel 222 has a predetermined length and is angled in the opposite direction as the first embodiment.

Referring to FIGS. 6A-6B generally, in accordance with a fourth embodiment of the present invention, an active side panel assembly 410 generally shown at 410 for a vehicle is identical to the first embodiment except that the deployable panel 422 is generally 'U' shaped and incorporates a slide out panel 442 slidably connected to the deployable panel 422 to slide in/out. The deployable panel 422 is operably rotatably coupled to the rocker panel assembly 414 and rotated up/down by the at least one actuator between a deployed position and stowed position. However, the slide out panel 442 is slidable received within the deployable panel 422 such that when stowed, the slide out panel 442 is slid into the deployable panel 422 and not seen when the deployable panel 422 is in the stowed position. When the active side panel assembly 410 is in the extended/down or deployed position, the deployable panel 422 and slide out panel 440 improve airflow. To deploy the assembly the panels 422, 442 are rotated downward generally 90° as a unit and the slide out panel 442 is then slid downward to the fully extended position by the same or an additional actuator. To stow the assembly, the slide out panel 442 slides into the deployable panel 422 and the panels 422, 442 are rotated upward as a unit into the area generally behind the rocker panel assembly 414.

Referring to FIGS. 7A-7C generally, in accordance with a fifth embodiment of the present invention, an active side panel assembly generally shown at 510 for a vehicle is identical to the first embodiment except that the deployable panel 522 has a generally channel shaped proximal end 528 and has a slidably connected slide out panel 542 that slides up/down. The deployable panel 522 is rotated down/up by the at least one actuator between a deployed position and stowed position. However, the slide out panel 542 is slidable received behind the deployable panel 522 such that when stowed, the slide out panel 542 is slid behind the deployable panel 522 and is not seen when the deployable panel 522 is rotated up to the stowed position. When the active side panel assembly 510 is in the extended/down or deployed position, the deployable panel 522 and slide out panel 542 improve airflow. To deploy the assembly the panels 522, 542 are rotated downward generally 90° as a unit and the slide out panel 542 is then slid downward to the fully extended position by the same or an additional actuator. To stow the assembly, the slide out panel 542 slides behind the deployable panel 522 and the panels 522, 542 are rotated upward as a unit into the area generally adjacent the lower end of the rocker panel assembly 514.

Referring to FIGS. 8A-8C generally, in accordance with a sixth embodiment of the present invention, there is provided an active side panel assembly generally shown at 610 for a vehicle. At least two panels form an integrated folding panel indicated generally at 622 comprised of a first panel 644 connected to a second panel 646 by at least one joint 648. Each panel has a first end and a second end. The proximal end 650 of the first panel 644 is pivotally connected to the rocker panel assembly 614 toward the bottom of the rocker 614. The second end of the first panel is pivotally connected to the first end of the second panel 652 at joint 648. At least one actuator drives the integrated folding panel 622 downward to the deployed position (FIGS. 8A, 8C), using the same or different actuator and drive shaft as the first embodiment. When the actuator drives the integrated folding panel 622 to the stowed position (FIG. 8B), the panels 644, 646 fold upward upon one another and such that the deployable panel 622 into the area generally the lower end of the rocker panel assembly 614. The assembly 610 could be jointed or hinged in the opposite direction without departing from the scope of the invention.

Referring to FIGS. 9A-9C generally, in accordance with a seventh embodiment of the present invention, there is provided an active side panel assembly generally shown at 710 for a vehicle. At least two panels form an integrated articulatingly connected panel indicated generally at 722 comprised of a first panel 744 connected between a second panel 746 and the rocker panel assembly 714, e.g., inner rocker panel 718. Each panel has a first end and a second end. The second end of the first panel 744 is pivotally connected near the center of the second panel 746 at pivot joint 748. The proximal end of the first panel 744 is angled a predetermined amount and pivotally connected to the rocker panel assembly 714 toward the bottom of the assembly 714. At least one actuator drives the integrated folding panel 722 downward to the deployed position (FIGS. 9A, 9C), using the same or different actuator and drive shaft as the first embodiment. When deployed, an upward portion of the second panel 746 is behind the first panel 744. The second panel 746 includes a central curve so that the exposed lower half of the second panel 746 is generally vertical. When the actuator drives the integrated folding panel 722 to the stowed position (FIG. 9B), the first panel 744 rotates upward and rearward to a generally horizontal position causing the second panel 746 to be driven upward.

Referring to FIGS. 10A-10C generally, in accordance with an eighth embodiment of the present invention, there is provided an active side panel assembly generally shown at 810 for a vehicle. At least two panels form an integrated folding panel indicated generally at 822 comprised of a first panel 844 connected to a second panel 846 by at least a first pivot joint 848. Each panel has a first end and a second end. The proximal end 856 of the second panel 846 is pivotally connected to the rocker panel assembly 814 toward the bottom of the rocker 814. One end of the first panel 844 is pivotally connected to the distal end of the second panel 846 at joint 854. At least one actuator drives the integrated folding panel 822 downward to the deployed position (FIGS. 10A, 10C), using the same or different actuator and drive shaft as the first embodiment. When the actuator drives the integrated folding panel 822 to the stowed position (FIG. 10B), the first panel 844 rotates upward about joint 854 and the second panel 846 rotates upward and rearward about joint 862.

Referring to FIGS. 11A-11C generally, in accordance with a ninth embodiment of the present invention, an active side panel assembly generally shown at 210 for a vehicle is identical to the first embodiment except that the deployable panel 922 is rotatably connected to the inner rocker panel 918 by at least one pair of flexible hinges 956.

Referring to FIGS. 12A-12C generally, in accordance with a tenth embodiment of the present invention, there is provided an active side panel assembly generally shown at 1010 for a vehicle movable between a stowed position and a deployed position (FIG. 12A, 12C). A deployable panel 1022 forms a scissor hinge panel. The panel is formed of a flexible and/or soft material, e.g., fabric, vinyl or other material, and is framed in semi-rigid or rigid material along at least the top edge, bottom edge and diagonally. Typically, a screw drive and higher speed actuator is employed. The bottom edge frame of the front frame bar 1058 can be adapted such that when driven to the stowed position the bar 1058 is driven upward to directly adjacent the top edge frame 1060.

Referring to FIGS. 13A-13C generally, in accordance with an eleventh embodiment of the present invention, there is provided an active side panel assembly generally shown at 1110 for a vehicle movable between a stowed position and a deployed position (FIG. 13A, 13C). A deployable panel 1122 includes a panel 1122 connected to a frame 1164 and rotatable brackets 1162 rotatable from a horizontal to vertical position. The panel 1122 is formed of stretchable material, e.g., rubber, and is driven downward to the extended deployed position as the brackets 1162 rotate and upward toward the rocker 1114 to the stowed position.

Referring to FIGS. 14A-14C generally, in accordance with a twelfth embodiment of the present invention, there is provided an active side panel assembly generally shown at 1210 for a vehicle movable between a stowed position and a deployed position (FIG. 14A, 14C). A deployable panel 1222 is connected to a frame 1264 and is foldable from the deployed to stowed position. The panel 1222 is formed of a soft material and is folded upward and rearward toward the rearward bottom of the rocker 1214 to the stowed position. Preferably, a cable mechanism is used to the panel 1222 upward out of the way.

Referring to FIGS. 15A-15C generally, in accordance with a thirteenth embodiment of the present invention, there is provided an active side panel assembly generally shown at 1310 for a vehicle movable between the deployed position (See FIG. 15A, 15C) and the stowed position (FIG. 15B). The assembly 1310 includes a deployable panel 1322 and preferably includes an under vehicle track arrangement forming a garage door style side panel system. A first set of rollers or the like are connected toward the edges of the panel 1322 to follow the track (slide or roll) in an upward/ rearward direction (FIG. 15A) and vice versa when the panel is driven by the actuator. Typically, the tracks have a 'U' shaped cross-section and are bolted in the base of the 'U' to the vehicle frame, chassis or other features. However, depending on the application tracks are welded, riveted, secured with adhesive and/or epoxy or otherwise connected depending on the application. Optionally, each track includes a first end and a second end with respective stop features in the second end.

Referring to FIGS. 16A-16C generally, in accordance with a fourteenth embodiment of the present invention, there is provided an active side panel assembly generally shown at 1410 for a vehicle movable between the deployed position (See FIG. 16A, 16C) and the stowed position (FIG. 16B). The assembly 1410 includes a deployable panel 1422 with a curved end 1466 and an under vehicle housing indicated generally at 1468. The housing 1468 includes an elongated opening 1470 sized for the panel 1422 to selectively extend downward through to the deployed position while preventing the curved end 1466 of the panel 1422 from moving laterally through the opening 1470.

Referring to FIGS. 17A-17C generally, in accordance with a fifteenth embodiment of the present invention, there is provided an active side panel assembly 1510 for a vehicle movable between a stowed position (FIG. 17B) and a deployed position (FIGS. 17A, 17C). A linkage assembly indicated generally at 1572 connects the deployable panel 1522 to the under vehicle frame, chassis or other features. Preferably, the linkage assembly is a four bar linkage. When the assembly 1510/panel 1522 is driven to the deployed position, the linkage arms 1574, 1576 extend the panel 1522 downward and outward to the deployed position generally below the rocker panel assembly 1514. When the assembly 1510/panel 1522 is driven to the stowed position, the linkage arms 1574, 1576 retract the panel 1522 rearward and upward to the stowed position generally behind the rocker panel assembly 1514.

Referring to FIGS. 18A-18C generally, in accordance with an sixteenth embodiment of the present invention, there is provided an active side panel assembly generally shown at 1610 for a vehicle movable between a stowed position and a deployed position (FIG. 18A, 18C). A deployable panel 1622 is connected to rotatable brackets 1662 rotatable from a horizontal to vertical position. The brackets 1662 are connected to or behind the inner rocker panel 1618. Rotation of the brackets 1662 allows the panel 1622 to be driven the generally downward and upward to the deployed and stowed position.

Referring to FIGS. 19A-19C generally, in accordance with an seventeenth embodiment of the present invention, there is provided an active side panel assembly generally shown at 1710 for a vehicle movable between a stowed position (FIG. 19B) and a deployed position (FIG. 19A, 19C). At least two panels form an integrated slidable panel indicated generally at 1722 comprised of a first panel 1744 slidably connected to and/or adjacent to a second panel 1746. The first panel 1744 is slidably connected adjacent the rear of the rocker panel assembly 1714, e.g., using a track arrangement. The second panel 1746 is slidably connected adjacent the rear of the first panel 1744, e.g., using a track arrangement, and generally parallel therewith when in the stowed position. When driven to the deployed position (FIGS. 19A, 19C) the first panel 1744 translates generally downward and forward and the second panel 1746 translates further downward and further and extends past the bottom edge of the first panel 1744 in the deployed position.

Referring to FIGS. 20A-20C generally, in accordance with an eighteenth embodiment of the present invention, there is provided an active side panel assembly generally shown at 1810 for a vehicle movable between a stowed position and a deployed position (FIG. 20A, 20C). A deployable panel 1822 is connected to a housing indicated generally at 1868. The housing 1868 includes an elongated opening 1870 sized for the panel 1822 to selectively extend downward through to the deployed position. A threaded flex screw mechanism indicated 1878 is adapted to connect to the panel 1822 such that when driven to the stowed position the panel 1822 is driven upward through the opening 1870 and when driven to the deployed position the panel 1822 is driven downward through the opening a predetermined amount.

Referring to FIGS. 21A-21C generally, in accordance with a nineteenth embodiment of the present invention, there is provided an active side panel assembly generally shown at 1910 for a vehicle movable between a stowed position and a deployed position (FIG. 21A, 21C). A deployable panel 1922 is fixed in location toward one end and rotatable at a second end. Toward the first end 1980 the panel 1922 is operably connected to the rocker panel assembly 1914 and/or other framing or chassis member(s) depending on the application and does not rotate. Thus, the first end 1980 is always exposed and in the deployed position, whether or not the assembly 1910 is deployed or stowed, while the second end 1982 is not exposed when in the stowed position. The other end 1982 is rotatably connected to the rocker panel assembly 14 and/or other framing or chassis member(s) depending on the application and is driven to move downward to the deployed position and upward to the stowed position generally behind the rocker assembly 1914. When deployed the second end 1982 of the panel 1922 is typically the same extended height as the first end 1980 of the panel 1922 from the bottom of the rocker assembly 1914. Predetermined angles and/or slants are contemplated for the panel 1922 depending on the application without departing from the scope of the invention.

Referring to FIGS. 22A-22C generally, in accordance with a twentieth embodiment of the present invention, there is provided an active side panel assembly generally shown at 2010 for a vehicle movable between a stowed position and a deployed position (FIG. 22C). A deployable panel generally indicated at 2022 is provided with a first panel 2044 connected in front of a second panel 2046. The first and second panel 2044, 2046 cross and the deployable panel 2022 is connected generally toward the centerline of the assembly 2010 by a bracket member 2062 or other fastening member to the rocker panel assembly 2014 and/or other framing or chassis member(s) depending on the application. The panel 2022 is rotatably connected and adapted such that both ends (one end of the first panel 2044 and one end of the second panel 2046 only) move down/up to the deployed/stowed positions. Predetermined angles and/or slants are contemplated for the panels depending on the application without departing from the scope of the invention.

Referring to FIGS. 23A-23C generally, in accordance with a twenty first embodiment of the present invention, there is provided an active side panel assembly generally shown at 2110 for a vehicle movable between a stowed (FIG. 21B) position and a deployed position (FIG. 21C). The deployable panel 2122 is operably rotatably connected to the rocker panel 2111 and/or other framing or chassis member(s) depending on the application and adapted via attachment member 2162 to allow at least one end of the panel 2122 to rotate downward/upward. When deployed one end of the panel 2122 is lower than the other end. Any number of suitable predetermined angles and/or slants are contemplated for the panel 2122 depending on the application without departing from the scope of the invention.

Referring generally to FIGS. 24-25, an exemplary actuator assembly with internal clutching is shown generally at 310, provided with a clutch system shown generally at 312, where the actuator 310 is employable with any embodiment described herein. At least one actuator 310 with internal clutching is used or other actuator and/or in combination with any additional actuator(s) is/are used in the system.

The clutch system 312 comprises a housing portion indicated generally at 312, an output shaft 316 which is received within and holds an output detent ring 318 and a moving detent ring 320.

During normal operation of the active side panel assembly 10, etc, the actuator assembly 310 provides power to drive and move the at least one panel 22, etc between at least the stowed position and deployed position. Also connected to the actuator assembly 310 is a rotatable drive shaft, e.g., drive shaft 32, that is operably connected to the at least one panel 22, etc and the output shaft 316 of the actuator assembly 310. The drive shaft 32 functions to deploy the at least one panel 22, etc in the event of predetermined conditions sensed by the actuator assembly 310 in order to move the at least one panel 22, etc to a fully extended deployed position for improved aerodynamics.

The output detent ring 318 is free to rotate on the output shaft 316 about a portion of the output shaft 316 that is not splined. The moving detent ring 320 is able to move axially to the output shaft 316 but is locked radially by a plurality of interlocking splines 322, 324 on both components. The output shaft 316 has interlocking splines 322 that are arranged parallel to the longitudinal axis and operably spaced about an outer surface located on a lower half of the output shaft 316. The moving detent ring 320 has outer interlocking splines 324 forming complementary channels to slidably interlock with the interlocking splines 322 for controlled axial movement of the moving detent ring 320. The interlocking splines 322 of the output shaft 316 terminate at an integrally formed projecting ring 326 having an abutting surface 328, lying transverse to the axis, against which the output detent ring 318 engages. The output detent ring 318 abuts against this surface 328 on the output shaft 316 and does not move axially.

An output gear 330 is in mesh with the output detent ring 318 for transmitting torque. The output gear 330 has spaced circumferential segments 332 that are generally square teeth like shaped held in place within opposing recesses 334 of the output detent ring 318 for transmitting the torque.

The output and moving detent rings 318, 320 have first and second intermeshing ramped teeth, generally shown at 336, 338, respectively, that are held together in mesh by the biasing force of a wave spring 340. The wave spring 340 is received on the outer output shaft 316 and provides a biasing force against the moving detent ring 320 in the direction of the output detent ring 318.

The components of the clutch system 310 (e.g., output shaft 316, output gear 330, output detent ring 318, moving detent ring 320, and wave spring 340) are held together by first and second locking rings 342, 344 located toward respective ends the output shaft 316 of the clutch assembly 312.

A motor 346 selectively provides torque suitable for particular applications. Suitable electronics 348, most preferably, a shut off printed circuit board (PCB) with connector contacts 350 correlate with vehicle communication networks for commanding the motor 46 based upon predetermined conditions, e.g., commanding energizing of the motor correlating with predetermined vehicle speed ranges. The PCB electronics senses current spike for override, which allows the clutch to disengage the drive system allowing it to rotate freely.

The motor 346 has a worm gear, shown generally at 352, which causes a main gear, shown generally at 354, to rotate. The main gear 354 has a gear and a helix angle portion 358. The worm gear 352 has a shaft, e.g., a threaded shaft, which engages the teeth of the gear 356, which causes the gear 356 of the main gear 354 to rotate as the worm gear 352 rotates. Rotation of the gear 356 causes the helix angle portion 358 of the main gear 354 to also rotate. The helix angle portion 358 rotatably engages the output gear 330. The gear ratio range of the gear 356 to helix angle portion 358 is operably suitable for transmitting torque from the motor/worm gear 346/352 to the output gear 330. The first and second intermeshing ramped teeth 336, 338 of the output and moving detent rings 318, 320 when held together by the biasing force of the wave spring 340 lock and allow the output shaft 316 to rotate and transmit the torque of the motor 346 through the main gear 354 and output gear 330 to the outside of the housing portion 314. The output shaft 330 is operably coupled to the drive shaft 32 for selectively rotating, folding or otherwise moving at least one panel 22 etc between at least the stowed position and the deployed position. The wave spring 340 allows for a more compact structure while meeting biasing and predetermined load requirements.

The housing portion 314 comprises a first half 360 and a second half 362. The first half 60 has a first clutch assembly cavity 364 and a first motor cavity 366. The second half 362 has a second clutch assembly cavity 368, a main gear cavity 370, and a second motor cavity. The clutch system 312 fits fully inside the first and second halves 360, 362 of the housing (within the first and second clutch assembly cavities 364, 368), as well as the motor 346 and electronics 348/350 (within the first motor cavity 366 and second motor cavity), and main gear 354 (within the main gear cavity 370). The first and second halves 360, 362 of the housing portion 314 are joined together, and connected with fasteners, and first and second seals added 372, 374 onto the output shaft 316 to form a weathertight housing. The housing 314 may be formed in the rocker panel module 14, etc. without departing from the scope of the invention.

In operation, the first and second intermeshing ramped teeth 336, 338 of the output and moving detent rings 318, 320, that when held together by the biasing force of the wave spring 340, lock together and allow the output shaft 316 to rotate. This allows torque transmission from the motor 346/worm gear 352 through the main gear 354 and output gear 330 to the outside of the housing portion 314 via the output shaft 316 to the drive shaft 32. During a predetermined level of high load, the first and second intermeshing ramped teeth 336, 338 create an axial force that overcomes the load from the wave spring 340. This allows the moving detent ring 320 to disengage and allow the output shaft 316 to rotate freely, thereby preventing damage to the sealed actuator internal clutching assembly 310.

Thus, there is provided a sealed actuator with internal clutching assembly 310 which can drive in both directions, but when stopped will hold its position without back driving when subjected to a predetermined load, e.g., a load many times greater than its dynamic range. The actuator 310 also protects itself from damage from predetermined loads, e.g., very high loads, by means of the clutch that will disengage the drive system allowing it to rotate (e.g., allowing the output shaft 316 to rotate freely). The sealed actuator with internal clutching assembly 310 is in a waterproof housing and can rotate in both directions for as many revolutions as needed. The clutch is fully self contained in the housing. The actuator has an output passthrough drive structure, e.g., output shaft 316 arrangement, allowing it to drive a shaft, e.g., drive shaft 32, or part from either side or both sides. The actuator 310 can be mounted to a fixed part with the only external moving part is the drive shaft 32. The clutch system 312 of the sealed actuator with internal clutching assembly 310 also does not change shape or height when it clutches, which is yet another significant advantage.

Referring to the Figures and embodiments generally, the panel 22, etc is adapted for attachment via at least one suitable fastener mechanism to the rocker panel assembly and/or side step/bar and/or other framing or chassis member(s) depending on the application, e.g., via a pair of hinges which can be any hinge arrangement suitable for predetermined cycling and durability requirements, living hinge, or any other fastener or the like. Alternatively, molded-in panel features which are used to attach to opposing vehicle features and/or in combination with at least one fastener for each hinge or the like may be used depending on the application. In addition, typically, the deployable panel 22, etc is movable from a deployed position to a stowed position. However, predetermined intermediate positions are contemplated without departing from the present invention. Additionally, tracks are contemplated for moving the panels, e.g., panels adapted with rollers translatable within the tracks between stages of deployment of the rollable panel from a stowed position to the deployed position and back. Typically, the tracks have a 'U' shaped cross-section and are bolted in the base of the 'U' to the rocker assembly, vehicle frame, chassis and/or other features. However, depending on the application tracks are welded, riveted, secured with adhesive and/or epoxy or otherwise connected depending on the application. Optionally, each track includes a first end and a second end with respective stop features in the second end. Class "A" surfaces on the housings and panels is contemplated. Panels with alternative profiles, angles, slants, etc are contemplated without departing from the scope of the invention.

The deployable panel 22, etc is made of a composite plastic in these particular embodiments. However, depending on the particular application, it is also within the scope of the invention to manufacture the deployable panel 22, etc of different materials such as steel or aluminum, painted carbon fiber, extruded rubber, or other suitable impact resistant material to withstand a predetermined load without departing from the scope of the invention. Additionally, the deployable panel 22 etc may consist of a single piece, e.g., of molded composite plastic, or multiple pieces assembled together.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A deployable side panel assembly for a vehicle, comprising:
    at least one deployable panel having a predetermined profile, where said first extending panel selectively deploys and retracts between a deployed position and a stowed position, where the deployment of the deployable panel improves aerodynamics; and
    at least one actuator operably coupled to the at least one deployable panel, where the actuator has object detection and is in communication with the vehicle for automatically deploying of the deployable panel under predetermined conditions and
    wherein the deployable panel is connected to and deployable from under a rocker panel assembly and/or other under vehicle structural member.

2. The deployable side panel assembly of claim 1, wherein the predetermined conditions are selected from vehicle speed, wind direction, yaw, and combinations thereof.

3. The deployable side panel assembly of claim 2, wherein the predetermined condition is at least vehicle speed in the range of at least 30 miles per hour.

4. The deployable side panel assembly of claim 1, wherein the actuator automatically retracts the deployable panel under predetermined conditions selected from vehicle speed, wind direction, yaw, higher predetermined loads, and combinations thereof.

5. The deployable side panel assembly of claim 4, wherein the predetermined conditions are at least vehicle speed in the range of less than 30 miles per hour and/or when the actuator senses higher predetermined loads.

6. The deployable side panel assembly of claim 5, wherein the object detection comprises electronics that sense current spike and provides circuit override.

7. The deployable side panel assembly of claim 6, wherein the actuator has declutching of gearing so that the deployable panel can move freely out of the way to prevent damage.

8. The deployable side panel assembly of claim 1, wherein the deployable panel is retracted upward to the stowed position, allowing for improved deployable side panel assembly ground clearance.

9. The deployable side panel assembly of claim 1, further comprising a threaded screw mechanism connected to the deployable panel to move the deployable panel between the deployed and vertical positions as the mechanism is turned.

10. The deployable side panel assembly of claim 1, wherein the deployable panel is formed of a flexible and/or stretchable material.

11. The deployable side panel assembly of claim 1, further comprising a rocker panel assembly, wherein the deployable panel is connected to the rocker panel and the rocker panel comprises a housing including an elongated opening sized for the deployable panel to selectively extend downward through to the deployed position while preventing a curved end of the deployable panel from moving laterally through the opening.

12. The deployable side panel assembly of claim 1, wherein the predetermined profile of the deployable panel is either angled, straight, slanted, curved, or combinations thereof.

13. A deployable side panel assembly for a vehicle, comprising:
   at least one deployable panel located substantially from front wheel well to rear wheel well of said vehicle, said at least one deployable panel selectively retracts upward to substantially horizontal underneath said vehicle under predetermined conditions and selectively rotates downward about 90 degrees under predetermined conditions to a deployed position below a rocker panel of said vehicle to improve crosswind aerodynamics by preventing side air flow from entering under said vehicle; and
   at least one actuator operably coupled to said at least one deployable panel, wherein the actuator has object detection that senses current spike for circuit override, and is in communication with the vehicle for automatically deploying of the deployable panel under predetermined conditions.

14. The deployable side panel assembly of claim 1, further comprising a threaded flex screw mechanism operably connected to the deployable panel to move the deployable panel a predetermined amount to the deployed and stowed positions.

* * * * *